United States Patent
Min et al.

(10) Patent No.: US 11,743,834 B2
(45) Date of Patent: Aug. 29, 2023

(54) ENHANCED MULTI-BAND POWER SAVING FOR WIRELESS COMMUNICATIONS

(71) Applicant: Intel Corporation, Santa Clara, CA (US)

(72) Inventors: Alexander Min, Portland, OR (US); Laurent Cariou, Portland, OR (US); Rath Vannithamby, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 641 days.

(21) Appl. No.: 16/729,195

(22) Filed: Dec. 27, 2019

(65) Prior Publication Data

US 2020/0137690 A1 Apr. 30, 2020

Related U.S. Application Data

(60) Provisional application No. 62/926,627, filed on Oct. 28, 2019, provisional application No. 62/926,795, filed on Oct. 28, 2019.

(51) Int. Cl.
*H04W 52/18* (2009.01)
*H04W 28/02* (2009.01)
*H04W 28/18* (2009.01)

(52) U.S. Cl.
CPC ....... *H04W 52/18* (2013.01); *H04W 28/0273* (2013.01); *H04W 28/18* (2013.01)

(58) Field of Classification Search
None
See application file for complete search history.

(56) References Cited

U.S. PATENT DOCUMENTS

2021/0360522 A1* 11/2021 Chitrakar .......... H04W 72/0453

* cited by examiner

*Primary Examiner* — Alex Skripnikov
(74) *Attorney, Agent, or Firm* — Eversheds Sutherland (US) LLP

(57) ABSTRACT

This disclosure describes systems, methods, and devices related to multi-band opportunistic power saving. A device may determine a first traffic indication associated with a first frequency band and a second traffic indication associated with a second frequency band. The device may determine a first power save indication associated with a station device and the first frequency band. The device may determine a second power save indication associated with the station device and the second frequency band. The device may generate a frame including the first traffic indication, the second traffic indication, the first power save indication, and the second power save indication. The device may send the frame using the first frequency band.

17 Claims, 29 Drawing Sheets

| B0 B1 | B2 B3 | B4 B5 B6 B7 | B8 | B9 | B10 | B11 | B12 | B13 | B14 | B15 |
|---|---|---|---|---|---|---|---|---|---|---|
| Protocol Version | Type (10) | Subtype (0100) | To DS | From DS | More Frag- ments | Retry | Power Management (1) | More Data | Protected Frame (0) | +HTC/ Order |
| 2 | 2 | 4 | 1 | 1 | 1 | 1 | 1 | 1 | 1 | 1 |

Bits:

ENHANCED MULTI-BAND POWER SAVING FOR WIRELESS COMMUNICATIONS

CROSS-REFERENCE TO RELATED APPLICATIONS

This application claims the benefit of U.S. Provisional Application No. 62/926,627, filed Oct. 28, 2019 and of U.S. Provisional Application No. 62/926,795, filed Oct. 28, 2019, both disclosures of which are incorporated by reference as if set forth in full.

TECHNICAL FIELD

This disclosure generally relates to systems and methods for wireless communications and, more particularly, to power saving for devices using multi-band communications.

BACKGROUND

Wireless devices are becoming widely prevalent and are increasingly using more resources. The Institute of Electrical and Electronics Engineers (IEEE) is developing one or more standards that utilize different frequency bands.

BRIEF DESCRIPTION OF THE DRAWINGS

FIG. 6E depicts an illustrative frame format for multi-band communications, in accordance with one or more example embodiments of the present disclosure.

DETAILED DESCRIPTION

Figure 1:
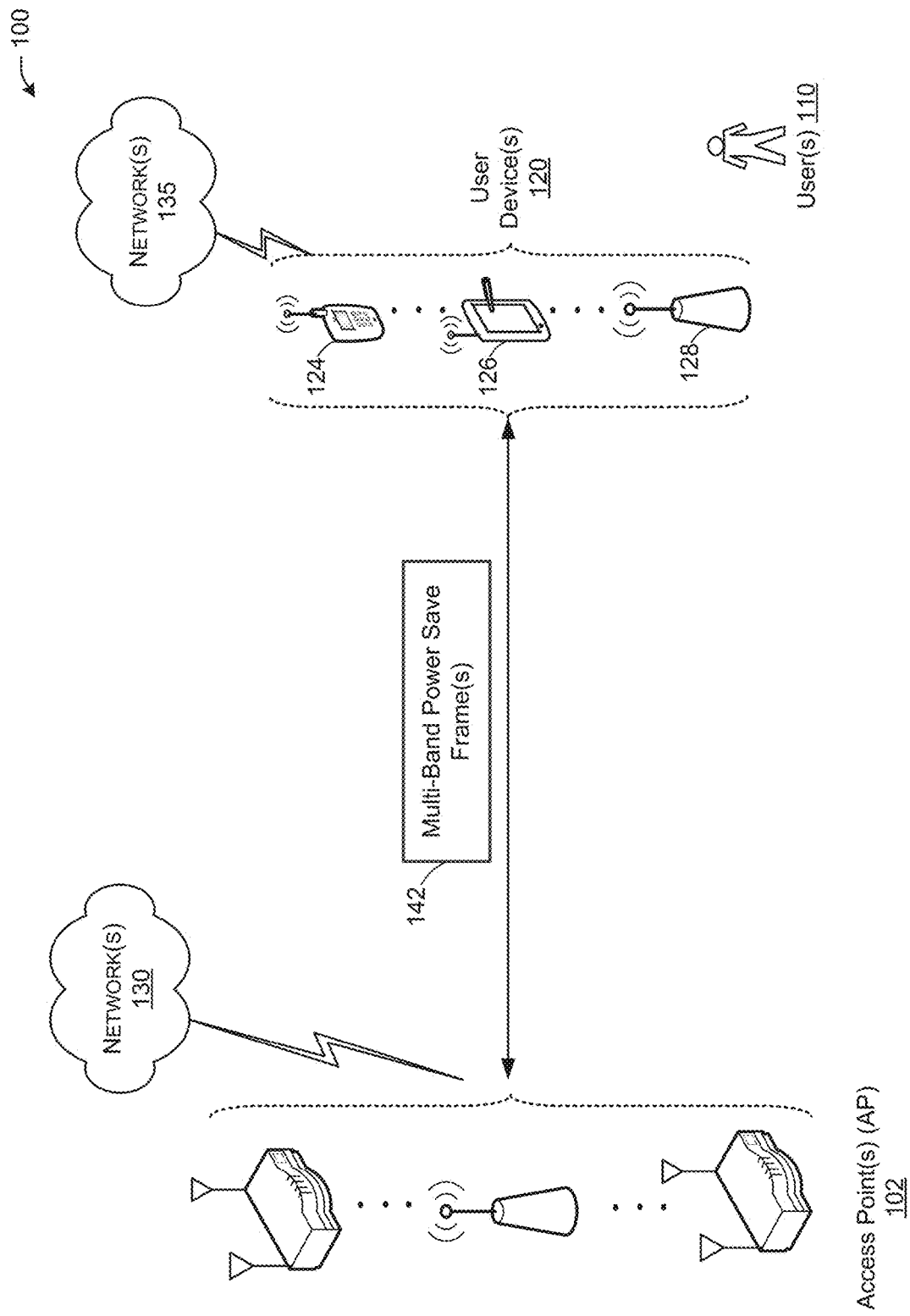
FIG. 1 is a network diagram illustrating an example network environment, in accordance with one or more example embodiments of the present disclosure.

Example embodiments described herein provide certain systems, methods, and devices for enhanced power saving in wireless communications. The following description and the drawings sufficiently illustrate specific embodiments to enable those skilled in the art to practice them. Other embodiments may incorporate structural, logical, electrical, process, algorithm, and other changes. Portions and features of some embodiments may be included in, or substituted for, those of other embodiments. Embodiments set forth in the claims encompass all available equivalents of those claims.

The IEEE 802.11ax technical standard introduced the opportunistic power save (OPS) mechanism and OPS Action frame format to allow an access point (AP) to update the scheduling information for all OPS station devices (STAs) associated with the AP so that the rest of the (unscheduled) STAs can enter doze mode for a defined period (i.e., referred to as an OPS Duration). However, the IEEE 802.11 standard does not provide for a concurrent multi-band operation for a given STA. For example, the IEEE 802.11 standard does not provide for a STA to communicate in both a 5 GHz and a 6 GHz band concurrently.

Because of the lack of concurrent multi-band operations for STAs provided for in the IEEE 802.11 standard, the IEEE 802.11 OPS frame may include only one traffic indication map (TIM) element for the current operating frequency band, and may not fully utilize the potential benefits of concurrent multi-band operations.

One example may be with power save (PS) behavior of a STA with existing "single-band" OPS frames used in multi-band Wi-Fi communications, in which the AP and STA are equipped with multiple transceivers operating on different frequency bands (e.g., 5 and 6 GHz bands). When STA 1 receives an OPS frame from the AP on a 5 GHz band, STA 1 may evaluate the TIM element in the OPS frame, and if STA 1 is not scheduled (e.g., is not indicated in the TIM), then STA 1 may enter a low-power sleep state for a certain period of time (i.e., the OPS Duration), which is indicated in the OPS element of the OPS frame. Upon expiration of the OPS Duration, STA 1 may wake up (e.g., activate) its 5 GHz transceiver even if it does not have data to receive from (or transmit to) the AP yet.

Because the existing OPS frame may only deliver a TIM element for the current operating band, devices cannot "piggyback" off of multi-band (MB) TIM element(s) for other operating band(s) in multi-band Wi-Fi communication scenarios (e.g., devices may not be able to receive OPS frames in one band that indicate TIMs and OPS Durations in another band). The lack of ability to piggyback MB TIM elements for other frequency bands may result in a waste of energy at STAs. Moreover, the current "single-band" OPS frame may be used to allow STAs to enter low-power sleep state, but not to wake up the transceivers from the sleep state.

Example embodiments of the present disclosure relate to systems, methods, and devices for enabling multi-band Opportunistic Power Save (OPS) mechanism for next-gen Wi-Fi.

In one embodiment, a multi-band opportunistic power save system may allow an AP to opportunistically piggyback multi-band (MB) TIM element of other frequency band(s) in "multi-band" OPS frames to multi-band-capable STAs. The multi-band (MB) OPS frame is an extension of the existing 802.11ax OPS frame with additional MB TIM and MB OPS elements for other operating frequency bands. With the MB OPS frame, the AP can opportunistically extend (or shorten) the duration of sleep state without waking up the transceiver using an OPS frame transmitted on the other frequency band.

By piggybacking MB TIM element(s) in the proposed "multi-band" OPS frames, STAs can receive updated TIM elements even for other frequency bands without waking up and receiving a new Beacon or OPS frame from the AP. This will allow multi-band-capable STAs to (i) stay longer in sleep states, (ii) wake up early to reduce latency in downlink data transmission, or (iii) enter sleep states on multiple frequency bands upon receiving a single MB OPS frame. By doing this, the STAs can save more power and/or reduce the delay in downlink data transmission.

Another power saving operation may include piggybacking MB TIM element(s) for other frequency bands in beacon frames so that an AP may update a TIM without waking a STA's transceiver on target frequency bands. An example may include power save mode behavior in which the AP sends beacon frames with multi-band (MB) TIM elements. In this example scenario, a beacon frame transmitted on a 6 GHz band includes (MB) TIM elements for 5 GHz and 6 GHz bands.

Once the 6 GHz transceiver at the STA processes the 5 GHz TIM element, then the STA may wake up its 5 GHz transceiver (e.g., collocated transceivers for different frequency bands). If the 5 GHz and 6 GHz TIM elements indicate the presence of data at the AP and for the STA on both bands, then both the 5 GHz and 6 GHz transceivers at the STA may send PS-Poll frames individually to retrieve data buffered at the AP.

While multi-band TIM element to piggyback TIM element(s) for other frequency bands in a single (in-band) beacon frame may be an example, the STA still needs to send separate PS-poll frames on each operating frequency band (i.e., 5 GHz and 6 GHz) in response to the 6 GHz beacon frame with TIM element(s) indicating that there is data buffered at the AP for both 5 GHz and 6 GHz bands.

The current IEEE 802.11 standard assumes a single-band operation, and the current PS-poll control frame only indicates the power save mode status of the current operating frequency band (e.g., 2.4 GHz or 5 GHz).

IEEE EHT (Extremely High Throughput) standard may enable multi-band Wi-Fi operations in which the AP may piggyback TIM element(s) for other frequency bands. However, a multi-band STA still needs to send separate PS-poll frames on each band to the AP which incurs additional medium access control (MAC)-layer overhead and delay in packet transmissions.

Example embodiments of the present disclosure relate to systems, methods, and devices for Multi-band PS-Poll for next-gen Wi-Fi.

In one embodiment, a multi-band PS-poll system may define a multi-band PS-poll frame to allow a multi-band station device (STA) to send a single "multi-band" PS-poll frame to indicate which frequency band(s) are awake as a response to Beacon (or opportunistic power save (OPS)) frames with multi-band TIM element(s).

One enhancement is to allow a multi-band STA to send a single "multi-band" PS-Poll frame to indicate which frequency bands are awake (e.g., 5 GHz only, 6 GHz only or both 5 GHz and 6 GHz bands). For example, when the STA receives a beacon frame on one frequency band (e.g., 6 GHz) with multiple (MB) TIM elements indicating that there is data to receive on multiple frequency bands (e.g., 5 GHz and 6 GHz), then the STA may wake up the radio(s) in other frequency band(s) and meanwhile send a single "multi-band" PS-poll frame on a current operating band (e.g., 6 GHz) to indicate that both 5 GHz and 6 GHz transceivers are ready to receive data from the AP.

By introducing multi-band PS-poll frame, STAs (i) do not need to send multiple PS-poll frames per frequency band in response to a beacon (or OPS) frame with MB TIM elements and/or (ii) do not need to wait until the target frequency band is awake before sending a PS-poll frame. Therefore, multi-band PS-poll may help reduce MAC-layer overhead and latency in data transmissions.

The IEEE 802.11ax communications standard introduced Target Wake Time (TWT) as a power save mechanism, which was first introduced in the IEEE 802.11ah standard, targeting low-power Internet of things (IoT) devices with periodic traffic patterns, for example. Some IEEE 802.11 communications may assume a single-band operation for TWT power save mechanisms. However, the TWT mechanism in the IEEE 802.11ax standard may assume a single-band operation and may be enhanced to support energy-efficient multi-band Wi-Fi communications, which is one of the main potential enabling features in the next-gen Wi-Fi, i.e., the IEEE EHT (Extremely High Throughput).

Multi-band-capable STAs may use existing TWT mechanisms for multi-band Wi-Fi communication scenarios, e.g., IEEE EHT, by independently setting up TWT agreements on any band, e.g., 5 and 6 GHz bands. However, the TWT service periods (SP) on any bands may not be aligned in time, which may increase total radio power consumption and decrease potential platform level power saving opportunities. Separately negotiating TWT SPs on each band may require more medium access control (MAC)-layer overhead due to TWT request/response frame exchanges on operating bands.

One of the main areas of focus of the next-generation Wi-Fi technology development, i.e., IEEE Extremely High Throughput (EHT), would be enabling concurrent multi-band operations. It may be possible for Wi-Fi access point (AP) and client devices (or station devices, STA) to be multi-band-capable, meaning that Wi-Fi STAs may associate with a Wi-Fi AP on multiple bands, e.g., 2.4, 5 and 6-7 GHz, and operate on them concurrently. For example, a multi-band-capable STA may associate with a multi-band Wi-Fi AP on two different frequency bands (e.g., 5 and 6-7 GHz) to enjoy higher throughput performance. Some IEEE 802.11 power save mode (PSM) mechanisms may be used in multi-band Wi-Fi communication scenarios with independent PSM operations on each band. However, an AP and STA may not fully utilize all of the available bands if the STA is associated with the AP on two or more frequency bands.

In such concurrent multi-band operations, the STA may enter power save mode on each frequency band independently based on traffic load, etc. For example, if the STA is in power save mode on 5 GHz band when the AP receives data to transmit to the STA on 5 GHz band, the STA may have to wait until the next Beacon transmission time (or TBTT, Target Beacon Transmission Time) to transmit it even if the STA is active on 6 GHz band. Such multi-band-agnostic packet transmission behavior may not fully leverage the presence of multiple operating frequency bands and radio resources and would result in sub-optimal performance in terms of latency and power.

The current IEEE 802.11 standard may assume a single-band operation for power save mechanisms. Enhanced techniques may allow for dynamically offloading packet transmissions to other frequency bands.

Example embodiments of the present disclosure relate to systems, methods, and devices for multi-band power conservation in wireless communications.

In one or more embodiments, enhanced methods may allow a multi-band-capable STA to align its TWT service periods across multiple bands so that the STA may maximize a sleep/idle duration to save power. A multi-band AP/STA may negotiate a TWT service period for multiple operating frequency bands using a single TWT negotiation process in one of the operating frequency bands. For example, if the STA is associated with the multi-band AP on a 5 GHz band and 6 GHz band, the STA may be able to negotiate and setup TWT services periods (SPs) on both bands with a single TWT request/response frame exchange on either the 5 GHz or 6 GHz band. In a multiband TWT request frame, the STA may be able to request the AP to configure the SPs in such a way that they are aligned in time to create longer device-level sleep durations. The enhanced multi-band TWT operations may (i) reduce MAC-layer overhead by avoiding multiple TWT request/response frame exchanges per band, and (ii) increase power saving opportunities at the STA by creating longer device-level sleep durations.

In one or more embodiments, enhanced methods may enable opportunistic offloading of packet transmission to other frequency bands in concurrent multi-band Wi-Fi communication scenarios. A new notion may indicate offloading packet transmissions to other frequency bands for multi-band Wi-Fi. A new data frame type and encoding rules may indicate the transition to power save mode with offloaded packet processing capability. New physical layer (PHY) signaling methods and frame formats may indicate PHY protocol data units (PPDUs) offloaded from other frequency bands. A new frame format for MAC capability may be exchanged for offloaded MAC protocol data unit (MPDU) processing capability. Enhancements may allow a multi-band AP to opportunistically send a packet on another frequency band if the STA is associated with the AP on multiple frequency bands (e.g., if a multiband-capable STA is associated to the AP on both the 5 and 6 GHz bands). If the AP has data to send to the STA on the 5 GHz band while the 5 GHz band is in power save mode, the AP may send the data to the STA on the 6 GHz band if the 6 GHz band is ready to receive the data. The process may be facilitated by introducing a signaling in PHY preamble indicating that the MPDU (or physical layer service data unit PSDU) is destined to a MAC on different frequency band. The enhanced opportunistic packet offloading mechanism may reduce MAC-layer latency in packet transmissions while minimizing the power consumption of a device's Wi-Fi radio.

In one example, TWT-based power save behavior when the current 802.11ax TWT mechanism may be used in multi-band Wi-Fi communications, in which the AP and STAs are equipped with multiple transceivers operating on different frequency bands (e.g., 5 GHz and 6-7 GHz bands). A STA may establish two separate individual TWT service period (SP) agreements on each band, and which are not aligned in time. As a result, a Wi-Fi radio of the STA needs to be powered on for a longer period of time, and hence may consume more power compared to the case where the SPs are aligned across multiple bands.

This disclosure provides methods for a multi-band-capable STA to align its TWT service periods across multiple bands so that it can maximize the sleep/idle duration to save power.

Multi-band-capable STAs may use existing TWT mechanisms for multi-band Wi-Fi communication scenarios, e.g., IEEE EHT, by independently setting up TWT agreements on each band (e.g., 5 GHz and 6 GHz bands). However, the TWT service periods (SP) on each band may not be aligned in time, which may increase total radio power consumption and decrease potential platform level power saving opportunities. Moreover, separately negotiating TWT SPs on each band will incur more MAC-layer overhead due to TWT request/response frame exchanges on all the operating bands.

This disclosure may allow a multi-band AP/STA to negotiate TWT service period for multiple operating frequency bands using a single TWT negotiation process in one of the operating frequency bands. For example, when a STA is associated with a multi-band AP on 5 GHz and 6 GHz bands, the STA should be able to negotiate and setup TWT services periods (SPs) on both bands with a single TWT request/response frame exchange on either the 5 GHz or 6 GHz band. In a proposed multi-band TWT request frame, the STA should be able to request the AP to configure the SPs in such a way that they are aligned in time to create longer device-level sleep durations.

The proposed multi-band TWT operations can (i) reduce MAC-layer overhead by avoiding multiple TWT request/response frame exchanges per band, and (ii) increase power saving opportunities at the STA by creating longer device-level sleep durations.

This disclosure may allow both Wi-Fi access point (AP) and client devices (or station, STA) to be multi-band-capable, meaning that Wi-Fi STAs can associate with an Wi-Fi AP on multiple bands, such as 2.4 GHz, 5 GHz, and 6-7 GHz, and operate on them concurrently.

For example, a multi-band-capable STA can associate with a multi-band Wi-Fi AP on two different frequency bands (e.g., 5 GHz and 6-7 GHz) to enjoy higher throughput performance.

In such concurrent multi-band operations, the STA may enter power save mode on each frequency band independently based on traffic load, etc. For example, if the STA is in power save mode on 5 GHz band when the AP receives data to transmit to the STA on 5 GHz band, the AP has to wait until the next beacon transmission time (or TBTT, Target Beacon Transmission Time) to transmit the data to the STA even if the STA is active on 6 GHz band. Such multi-band-agnostic packet transmission behavior cannot fully leverage the presence of multiple operating frequency bands and radio resources and would result in sub-optimal performance in terms of latency and power.

Some benefits of the multi-band power saving operations may include a new notion of offloading packet transmissions to other frequency bands for multi-band Wi-Fi, a new data frame type and encoding rules to indicate the transition to power save mode with offloaded packet processing capability, a new physical layer (PHY) signaling methods and frame formats to indicate PHY protocol data units (PPDUs) offloaded from other frequency bands, and a new frame format for MAC capability exchange for offloaded MAC protocol data units (MPDUs) processing capability.

The current IEEE 802.11 standard assumes a single-band operation for power save mechanisms. There are no known existing techniques to dynamically offload packet transmissions to other frequency bands.

The current 802.11 PSM mechanisms can be used in multi-band Wi-Fi communication scenarios with independent PSM operations on each band. However, if the AP and STA cannot fully utilize all of the available bands if the STA is associated to the AP on two or more frequency bands.

One idea of this disclosure is to allow a multi-band AP to opportunistically send a packet on other frequency band if the STA is associated with the AP on multiple frequency bands. For example, assume that a multi-band-capable STA is associated to the AP on both 5 GHz and 6 GHz bands. Then, if the AP has data to send to the STA on the 5 GHz band while the 5 GHz band is in power save mode, the AP can send the data to the STA on the 6 GHz band if the STA is ready to receive the data on the 6 GHz band. This can be done by introducing a signaling in a PHY preamble indicating that the MPDU (or PSDU) is destined to a MAC on different frequency band.

The proposed opportunistic packet offloading mechanism may reduce MAC-layer latency in packet transmission while minimizing the power consumption of the Wi-Fi radio.

The above descriptions are for purposes of illustration and are not meant to be limiting. Numerous other examples, configurations, processes, algorithms, etc., may exist, some of which are described in greater detail below. Example embodiments will now be described with reference to the accompanying figures.

FIG. 1 is a network diagram illustrating an example network environment, according to some example embodiments of the present disclosure. Wireless network 100 may include one or more user devices 120 and one or more access points(s) (AP) 102, which may communicate in accordance with IEEE 802.11 communication standards. The user device(s) 120 may be mobile devices that are non-stationary (e.g., not having fixed locations) or may be stationary devices.

Figure 8:
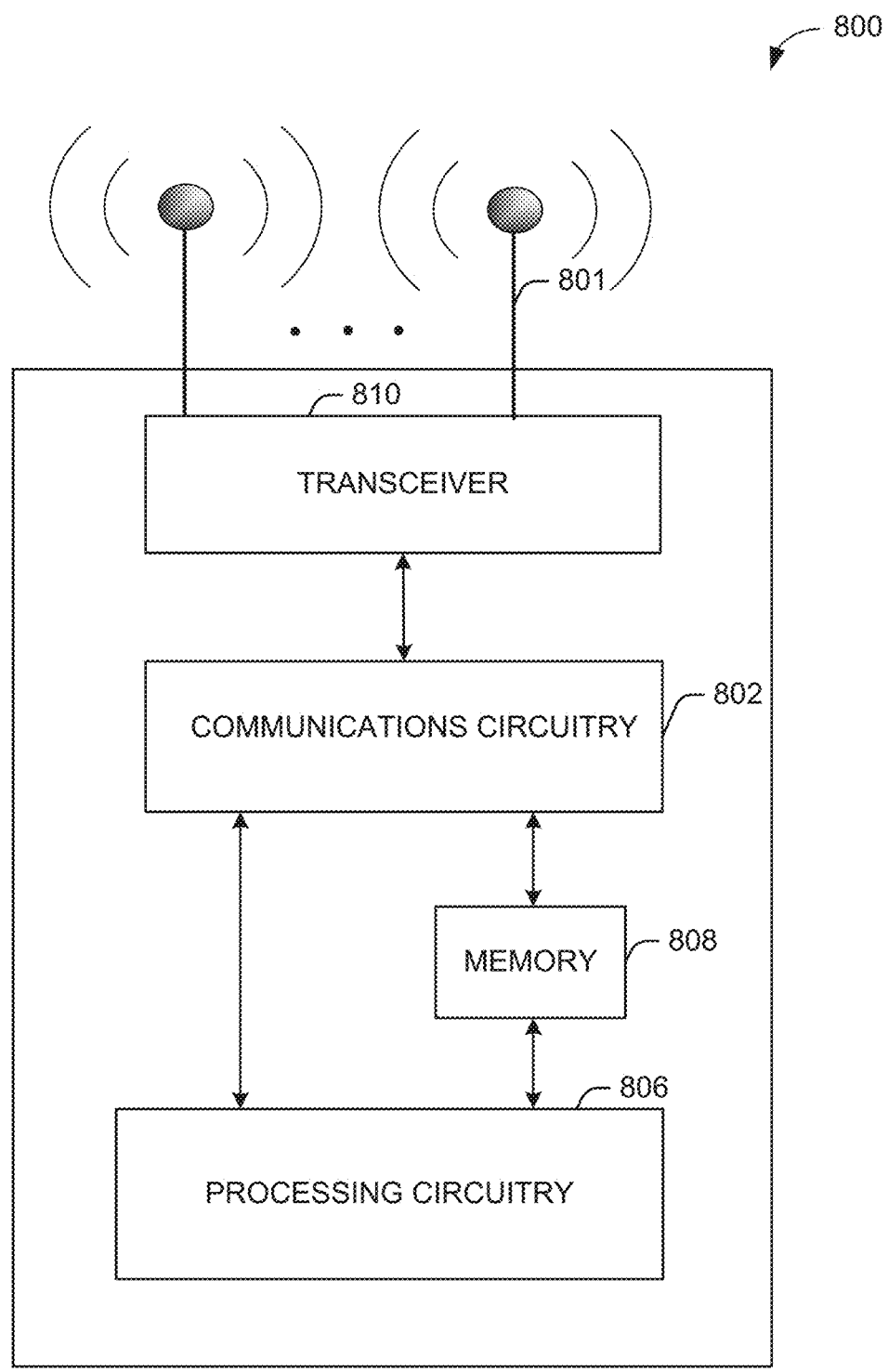
FIG. 8 illustrates a functional diagram of an exemplary communication station that may be suitable for use as a user device, in accordance with one or more example embodiments of the present disclosure.
Figure 9:
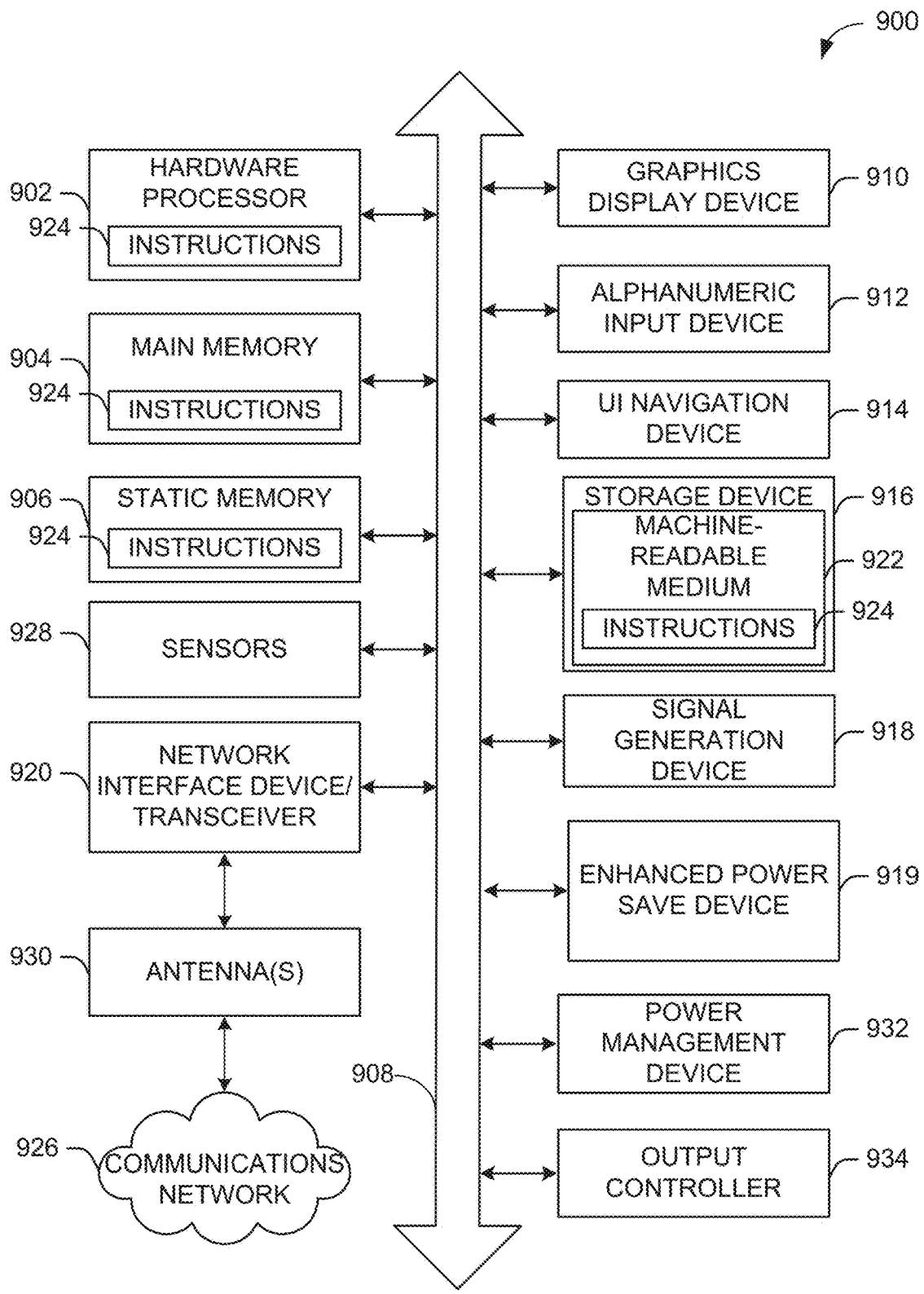
FIG. 9 illustrates a block diagram of an example machine upon which any of one or more techniques (e.g., methods) may be performed, in accordance with one or more example embodiments of the present disclosure.

In some embodiments, the user devices 120 and the AP 102 may include one or more computer systems similar to that of the functional diagram of FIG. 8 and/or the example machine/system of FIG. 9.

One or more illustrative user device(s) 120 and/or AP(s) 102 may be operable by one or more user(s) 110. It should be noted that any addressable unit may be a station (STA). An STA may take on multiple distinct characteristics, each of which shape its function. For example, a single addressable unit might simultaneously be a portable STA, a quality-of-service (QoS) STA, a dependent STA, and a hidden STA. The one or more illustrative user device(s) 120 and the AP(s) 102 may be STAs. The one or more illustrative user device(s) 120 and/or AP(s) 102 may operate as a personal basic service set (PBSS) control point/access point (PCP/AP). The user device(s) 120 (e.g., 124, 126, or 128) and/or AP(s) 102 may include any suitable processor-driven device including, but not limited to, a mobile device or a non-mobile, e.g., a static device. For example, user device(s) 120 and/or AP(s) 102 may include, a user equipment (UE), a station (STA), an access point (AP), a software enabled AP (SoftAP), a personal computer (PC), a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. Other devices, including smart devices such as lamps, climate control, car components, household components, appliances, etc. may also be included in this list.

As used herein, the term "Internet of Things (IoT) device" is used to refer to any object (e.g., an appliance, a sensor, etc.) that has an addressable interface (e.g., an Internet protocol (IP) address, a Bluetooth identifier (ID), a near-field communication (NFC) ID, etc.) and can transmit information to one or more other devices over a wired or wireless connection. An IoT device may have a passive communication interface, such as a quick response (QR) code, a radio-frequency identification (RFID) tag, an NFC tag, or the like, or an active communication interface, such as a modem, a transceiver, a transmitter-receiver, or the like. An IoT device can have a particular set of attributes (e.g., a device state or status, such as whether the IoT device is on or off, open or closed, idle or active, available for task execution or busy, and so on, a cooling or heating function, an environmental monitoring or recording function, a light-emitting function, a sound-emitting function, etc.) that can be embedded in and/or controlled/monitored by a central processing unit (CPU), microprocessor, ASIC, or the like, and configured for connection to an IoT network such as a local ad-hoc network or the Internet. For example, IoT devices may include, but are not limited to, refrigerators, toasters, ovens, microwaves, freezers, dishwashers, dishes, hand tools, clothes washers, clothes dryers, furnaces, air conditioners, thermostats, televisions, light fixtures, vacuum cleaners, sprinklers, electricity meters, gas meters, etc., so long as the devices are equipped with an addressable communications interface for communicating with the IoT network. IoT devices may also include cell phones, desktop computers, laptop computers, tablet computers, personal digital assistants (PDAs), etc. Accordingly, the IoT network may be comprised of a combination of "legacy" Internet-accessible devices (e.g., laptop or desktop computers, cell phones, etc.) in addition to devices that do not typically have Internet-connectivity (e.g., dishwashers, etc.).

The user device(s) 120 and/or AP(s) 102 may also include mesh stations in, for example, a mesh network, in accordance with one or more IEEE 802.11 standards and/or 3GPP standards.

Any of the user device(s) 120 (e.g., user devices 124, 126, 128), and AP(s) 102 may be configured to communicate with each other via one or more communications networks 130 and/or 135 wirelessly or wired. The user device(s) 120 may also communicate peer-to-peer or directly with each other with or without the AP(s) 102. Any of the communications networks 130 and/or 135 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 130 and/or 135 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 130 and/or 135 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Any of the user device(s) 120 (e.g., user devices 124, 126, 128) and AP(s) 102 may include one or more communications antennas. The one or more communications antennas may be any suitable type of antennas corresponding to the communications protocols used by the user device(s) 120 (e.g., user devices 124, 126 and 128), and AP(s) 102. Some non-limiting examples of suitable communications antennas include Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, omnidirectional antennas, quasi-omnidirectional antennas, or the like. The one or more communications antennas may be communicatively coupled to a radio component to transmit and/or receive signals, such as communications signals to and/or from the user devices 120 and/or AP(s) 102.

Any of the user device(s) 120 (e.g., user devices 124, 126, 128), and AP(s) 102 may be configured to perform directional transmission and/or directional reception in conjunction with wirelessly communicating in a wireless network. Any of the user device(s) 120 (e.g., user devices 124, 126, 128), and AP(s) 102 may be configured to perform such directional transmission and/or reception using a set of multiple antenna arrays (e.g., DMG antenna arrays or the like). Each of the multiple antenna arrays may be used for transmission and/or reception in a particular respective direction or range of directions. Any of the user device(s) 120 (e.g., user devices 124, 126, 128), and AP(s) 102 may be configured to perform any given directional transmission towards one or more defined transmit sectors. Any of the user device(s) 120 (e.g., user devices 124, 126, 128), and AP(s) 102 may be configured to perform any given directional reception from one or more defined receive sectors.

MIMO beamforming in a wireless network may be accomplished using RF beamforming and/or digital beamforming. In some embodiments, in performing a given MIMO transmission, user devices 120 and/or AP(s) 102 may be configured to use all or a subset of its one or more communications antennas to perform MIMO beamforming.

Any of the user devices 120 (e.g., user devices 124, 126, 128), and AP(s) 102 may include any suitable radio and/or transceiver for transmitting and/or receiving radio frequency (RF) signals in the bandwidth and/or channels corresponding to the communications protocols utilized by any of the user device(s) 120 and AP(s) 102 to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the Institute of Electrical and Electronics Engineers (IEEE) 802.11 standards. In certain example embodiments, the radio component, in cooperation with the communications antennas, may be configured to communicate via 2.4 GHz channels (e.g. 802.11b, 802.11g, 802.11n, 802.11ax), 5 GHz channels (e.g. 802.11n, 802.11ac, 802.11ax), or 60 GHZ channels (e.g. 802.11ad, 802.11ay). 800 MHz channels (e.g. 802.11ah). The communications antennas may operate at 28 GHz and 40 GHz. It should be understood that this list of communication channels in accordance with certain 802.11 standards is only a partial list and that other 802.11 standards may be used (e.g., Next Generation Wi-Fi, or other standards). In some embodiments, non-Wi-Fi protocols may be used for communications between devices, such as Bluetooth, dedicated short-range communication (DSRC), Ultra-High Frequency (UHF) (e.g. IEEE 802.11af, IEEE 802.22), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and digital baseband.

In one embodiment, and with reference to FIG. 1, AP 102 may send one or more multi-band power save frames 142 to the one or more user devices 120. For example, the one or more user devices 120 may operate in multiple frequency bands concurrently, and the one or more multi-band power save frames 142 may include OPS frames with TIMs and OPS durations for one or more multiple frequency bands, including the frequency bands in which the one or more user devices 120 may be operating.

It is understood that the above descriptions are for purposes of illustration and are not meant to be limiting.

Figure 2:
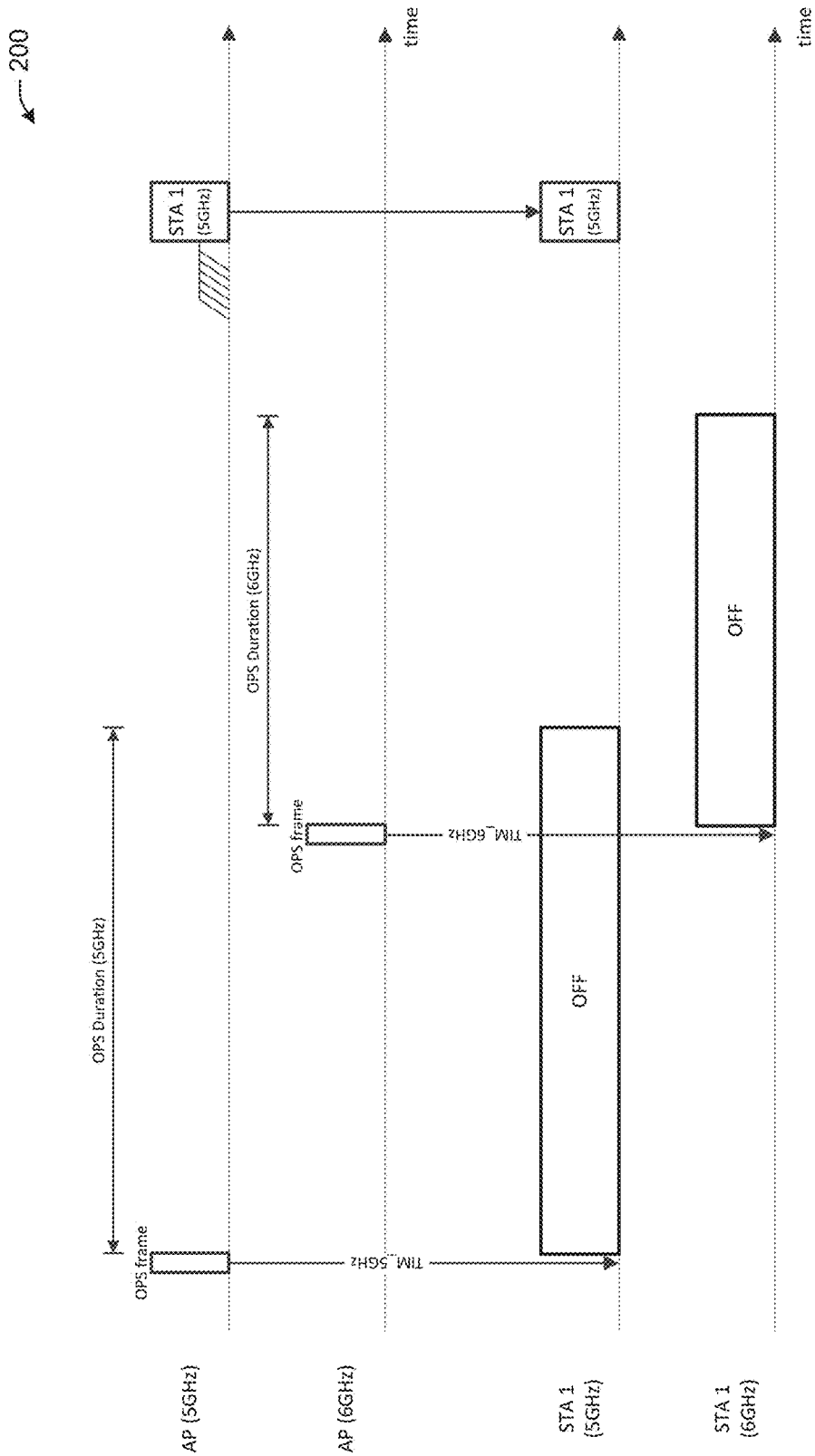
FIG. 2 depicts an illustrative schematic diagram for single-band communications, in accordance with one or more example embodiments of the present disclosure.

FIG. 2 depicts an illustrative schematic diagram 200 for single-band communications, in accordance with one or more example embodiments of the present disclosure.

FIG. 2 illustrates an example power save (PS) behavior of a STA using existing "single-band" OPS frames in multi-band Wi-Fi communications, in which the AP and STA are equipped with multiple transceivers operating on different frequency bands (e.g., 5 GHz and 6 GHz bands). As shown in FIG. 2, when STA 1 receives an OPS frame on the 5 GHz band, the STA 1 examines a TIM element in the OPS frame, and if the STA 1 is not scheduled (e.g., the TIM does not indicate that the STA 1 is to receive traffic from the AP), then the STA 1 can enter a low-power sleep state for a certain period of time (i.e., OPS Duration), which is indicated in the OPS element of the OPS frame. Upon expiration of the OPS Duration, the STA 1 wakes up its 5 GHz transceiver even if the STA 1 does not have data to receive from (or transmit to) the AP, or has not yet been scheduled by the AP.

In the current IEEE 802.11 standards, the OPS frame may include a TIM element for the current operating frequency band of the STA 1. The format of the current OPS frame is shown in Table 1 below.

TABLE 1

OPS frame Action field format in IEEE 802.11ax.

| Order | Information |
|---|---|
| 1 | Category |
| 2 | High Efficiency (HE) Action |
| 3 | TIM element |
| 4 | OPS element |

Referring to Table 1, the TIM element includes an indication of traffic for any STA, including the STA 1. The OPS element may indicate the OPS duration, during which the STA 1 may enter a power save mode when the STA 1 is not scheduled by the TIM to receive traffic from the AP.

Figure 3A:
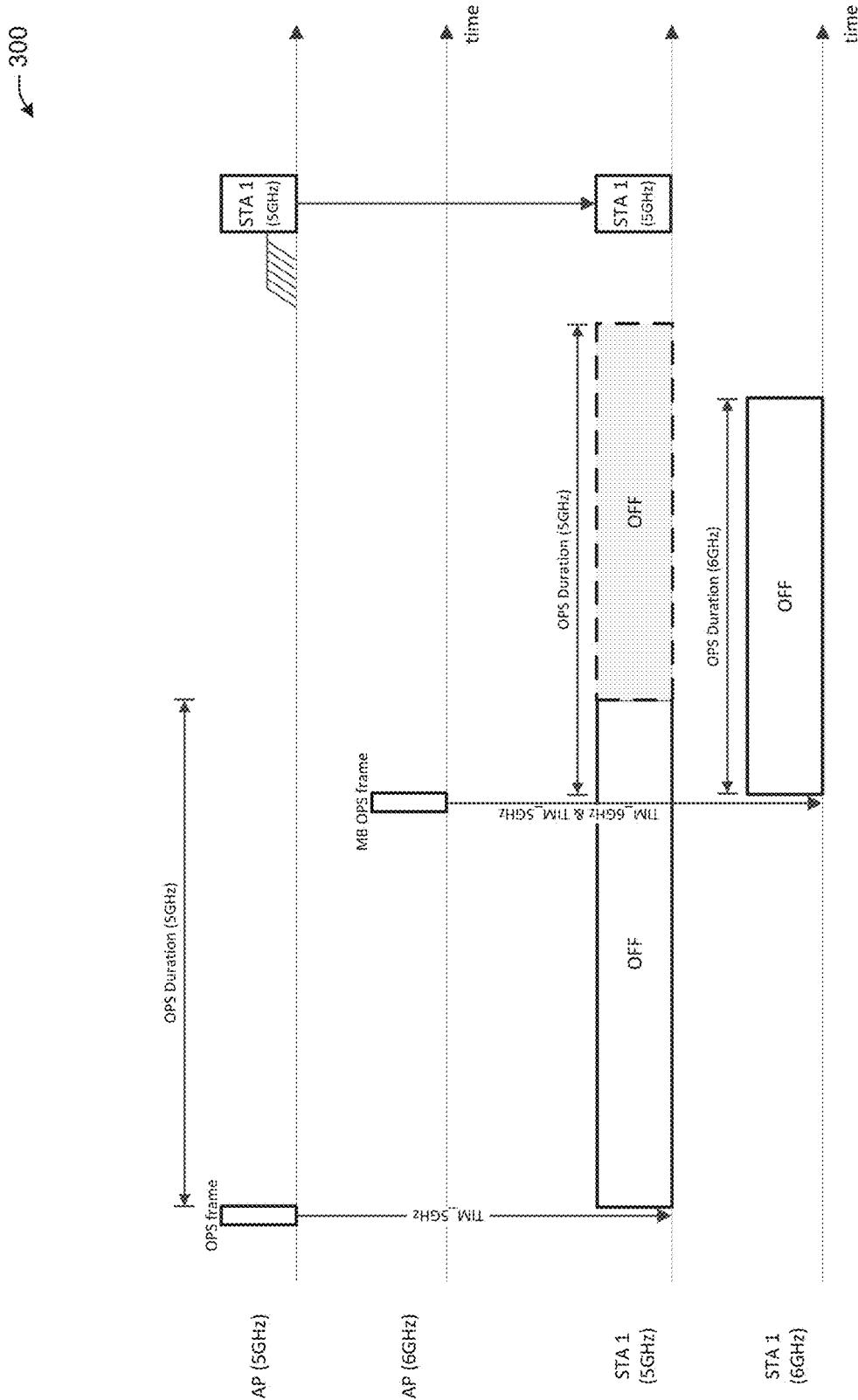
FIG. 3A depicts an illustrative schematic diagram for multi-band communications, in accordance with one or more example embodiments of the present disclosure.

FIG. 3A depicts an illustrative schematic diagram 300 for multi-band communications, in accordance with one or more example embodiments of the present disclosure.

As shown in FIG. 3A, when the AP is sending an OPS frame on a 6 GHz band, the AP also may send an updated scheduling information (e.g., a TIM) on a 5 GHz band by piggybacking an updated "MB TIM" element and the corresponding "OPS Duration" for the 5 GHz band in the OPS frame transmitted on 6 GHz band, which may be referred to as "multi-band (MB) OPS" frame in the FIG. 2.

For example, when the AP is sending the OPS frame on the 6 GHz band, the OPS duration on the 5 GHz band set by the OPS frame transmitted by the AP earlier on the 5 GHz band would expire shortly afterward. However, if the AP does not have a plan to schedule STA 1 on the 5 GHz band in the near future, then the AP may piggyback the 5 GHz MB TIM element and send a MB OPS frame on the 6 GHz band. In the MB OPS frame, the AP may set the 5 GHz TIM bit for STA 1 to "0" in the 5 GHz "MB TIM" element and indicate a new "OPS Duration" in the 5 GHz "MB OPS" element. In this manner, the AP may notify the STA 1 that the STA 1 may remain in a power save state in the 5 GHz band for the next OPS duration rather than waking up to receive another OPS frame in the 5 GHz band that communicates the 5 GHz TIM and OPS duration. The next OPS duration in the 5 GHz band may begin at the time that the MP OPS frame is received by the STA 1 on the 6 GHz band. Once the STA 1 has activated its 5 GHz radio (e.g., because the AP has indicated using the TIM that the AP has traffic for the STA 1), the AP may send unicast data to the STA 1 on the 5 GHz frame. The MB OPS frame may include a 6 GHz TIM and OPS duration, and a 5 GHz TIM and OPS duration.

FIG. 3A provides an example behavior of the proposed multi-band power save mode (PSM) with piggybacked TIM information to extend the sleep duration on the other frequency band.

In one or more embodiments, once STA 1 receives the MB OPS frame on the 6 GHz band, the STA 1 may look for the 5 GHz "MB TIM" element (if present). If the 5 GHz MB TIM element indicates that STA 1 does not have data to receive from the AP, then a 6 GHz receive (RX) MAC processor of the STA 1 may communicate such information to the 5 GHz transceiver (or power management unit) of the STA 1 to reset (or extend) a sleep timer based on a value indicated in the "OPS Duration" subfield. By doing this, the 5 GHz transceiver of the STA 1 may remain in a sleep state longer until the new "OPS Duration" expires without needing to wake up the 5 GHz transceiver, and may idle-listen until the STA 1 receives a data (or another OPS frame) from the AP.

Figure 3B:
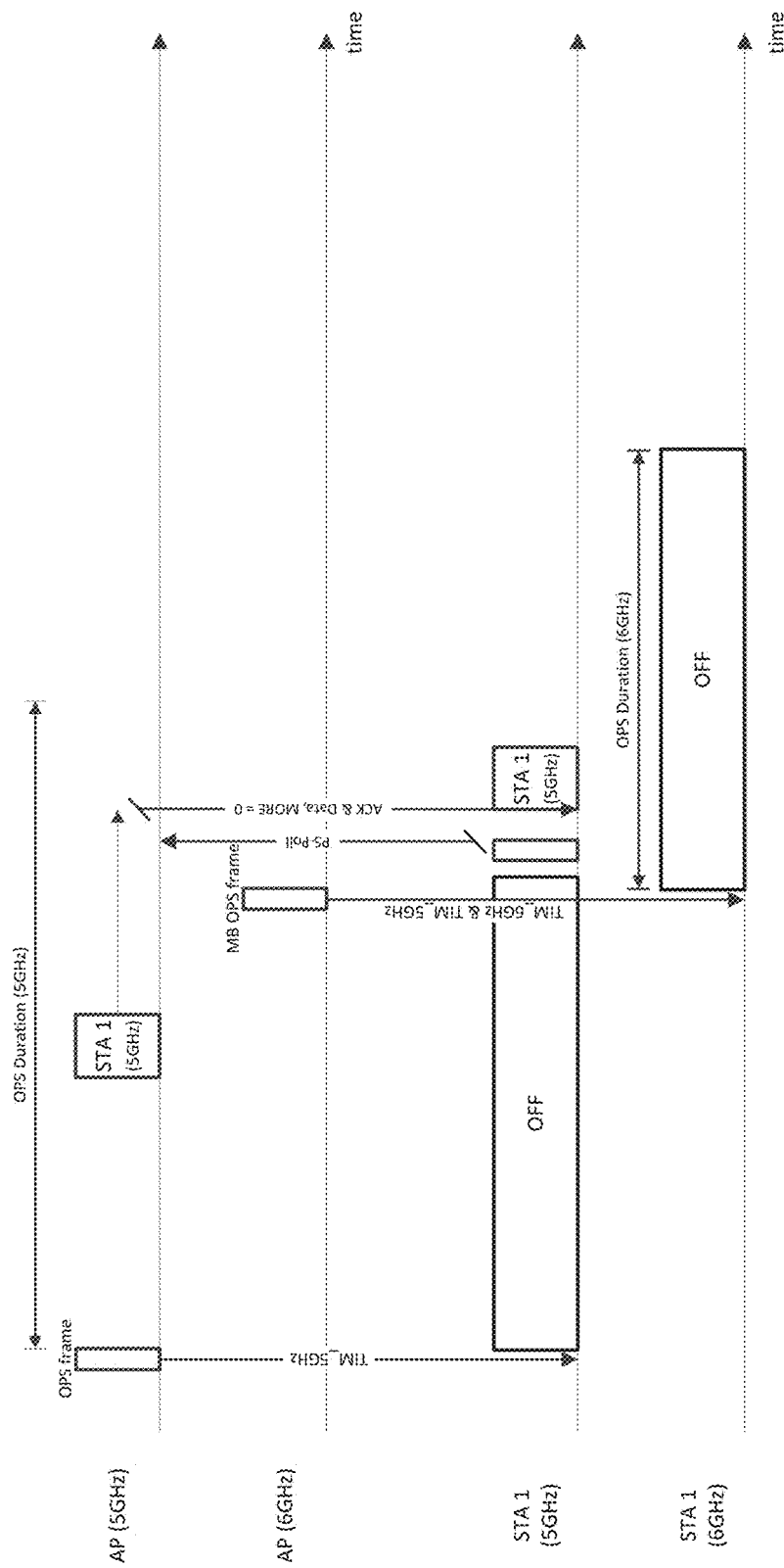
FIG. 3B depicts an illustrative schematic diagram for multi-band communications, in accordance with one or more example embodiments of the present disclosure.

FIG. 3B depicts an illustrative schematic diagram 350 for multi-band communications, in accordance with one or more example embodiments of the present disclosure.

Referring to FIG. 3B, the AP may piggyback off of a MB TIM element for other frequency band(s) in a MB OPS frame to "wake up" a transceiver of the STA 1 on another frequency band before the current OPS Duration expires. For example, when the AP receives data to transmit to the STA 1 on the 5 GHz band while the 5 GHz transceiver of the STA 1 is in sleep mode, the AP may piggyback a 5 GHz MB TIM element in the MB OPS frame transmitted on 6 GHz band to early terminate the OPS duration and wake up the 5 GHz transceiver to received data from the AP. In this manner, rather than the AP waiting for the OPS duration in the 5 GHz band to expire to send another OPS frame to the STA 1 to notify the STA 1 of the traffic that the AP has for the STA 1, the AP may send the MB OPS frame in the 6 GHz band to notify the STA 1 that the AP has traffic for the STA 1 in the 5 GHz band. When the STA 1 identifies that the AP has traffic for the STA 1 in the 5 GHz band, the STA 1 may wake up its 5 GHz radio to send a poll frame (e.g., a PS-Poll) to the AP to notify the AP that the STA 1 has activated its 5 GHz radio. Subsequently, the AP may send the traffic to the STA 1 in the 5 GHz band (e.g., by sending an acknowledgment and traffic).

In one or more embodiments, once STA 1 receives the MB OPS frame on the 6 GHz band, the STA 1 may process the 5 GHz TIM element of the MB OPS frame, may wake up its 5 GHz transceiver, and the 5 GHz transceiver may send a PS-Poll frame to the AP to retrieve the buffered data on 5 GHz band. This is different from an existing OPS frame in that the AP uses the OPS frame to wake up the STA 1 early from the OPS-configured sleep state in the 5 GHz band. By doing this, the AP may benefit from the multi-band capability of the STA and reduce the latency in downlink data transmission.

Figure 3C:
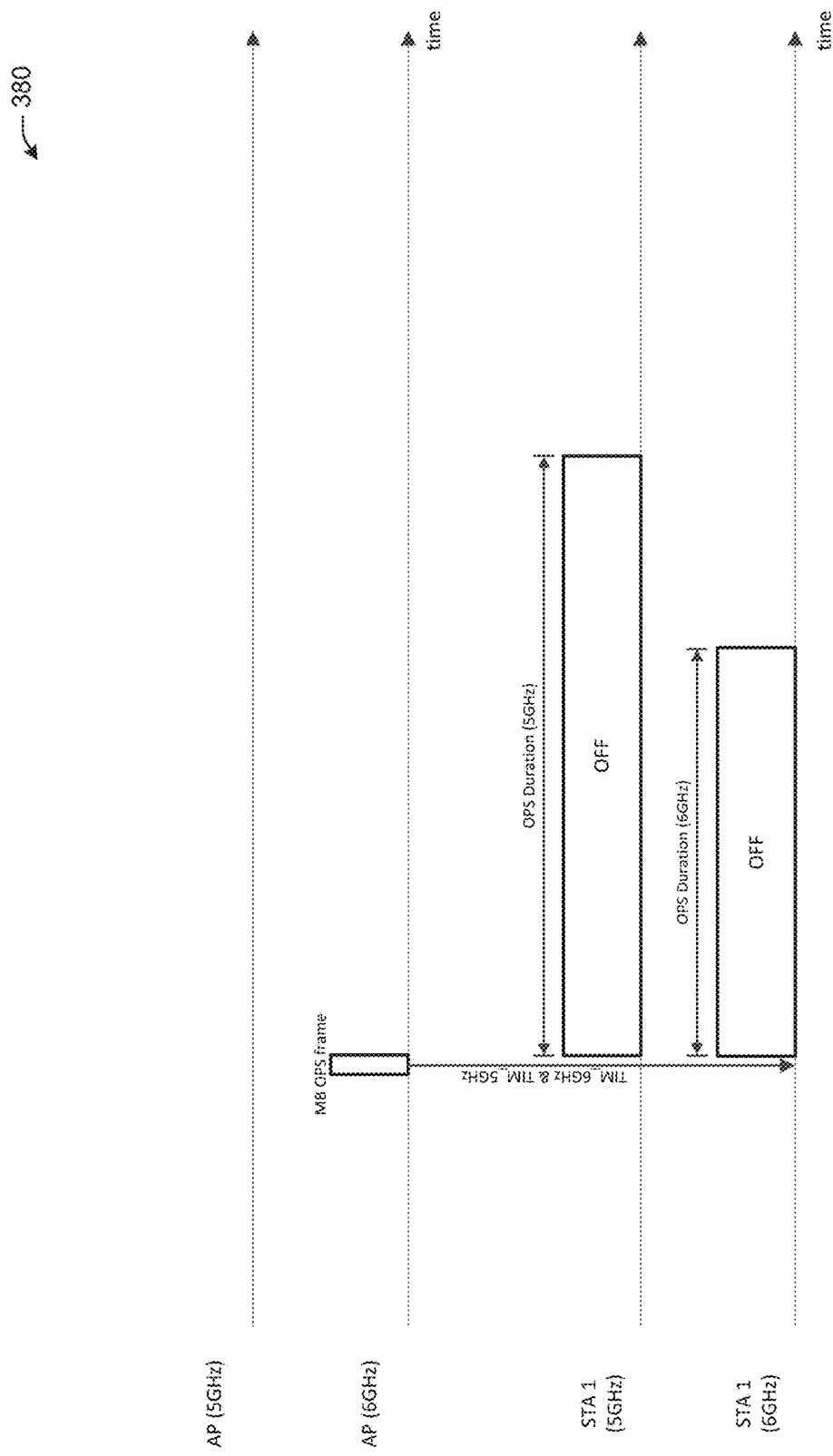
FIG. 3C depicts an illustrative schematic diagram for multi-band communications, in accordance with one or more example embodiments of the present disclosure.

FIG. 3C depicts an illustrative schematic diagram 380 for multi-band communications, in accordance with one or more example embodiments of the present disclosure.

Referring to FIG. 3C, the AP may use the proposed MB OPS frame to deliver (MB) TIM elements for multiple frequency bands (e.g., 5 GHz and 6 GHz). For example, the AP may send a MB OPS frame on the 6 GHz band, which may include TIM and OPS elements for 6 GHz band, and also MB TIM and MB OPS elements for the 5 GHz band. Once the STA 1 receives the MB OPS frame on the 6 GHz band, the STA 1 may process the TIM and OPS elements for the 5 GHz and 6 GHz bands, and enter a sleep state for the OPS durations indicated in received (MB) OPS elements. By doing this, STA 1 radios may enter OPS-induced sleep states on multiple frequency bands without needing to receive multiple OPS frames on all the bands separately.

Referring to FIG. 3A-3C, the MB OPS frame may include enhancements from an existing OPS frame as shown below in Table 2. The proposed "MB OPS" frame format may be defined in the IEEE 802.11 standard with one or more TIM and OPS elements including one for the current frequency band and one or more pairs of "MB TIM" and "MB OPS" element(s) for other frequency bands, as shown in Table 2 below.

TABLE 2

Proposed multi-band (MB) OPS frame Action field format.

| Order | Information |
|---|---|
| 1 | Category |
| 2 | HE Action |
| 3 | TIM element |
| 4 | OPS element |
| 5 | Multi-band TIM element(s) |
| 6 | Multi-band OPS element(s) |

For "MB TIM" and "MB OPS" elements, a new "Element ID" encoding may be assigned to differentiate the elements respectively from the legacy TIM and OPS elements of a current OPS frame. The new elements also may include new subfield (e.g., "Band") to indicate the target frequency band (e.g., so that regardless of which band the OPS frame is received in, the receiving STA may identify for which band the TIM and OPS duration are referring).

Table 3 and Table 4 show the frame format of the legacy OPS frame TIM and OPS elements as a reference.

TABLE 3

TIM element of existing OPS frame.

| Element: | Element ID | Length | DTIM Count | DTIM Period | Bitmap Control | Partial Virtual Bitmap |
|---|---|---|---|---|---|---|
| Octets: | 1 | 1 | 1 | 1 | 1 | 1-251 |

TABLE 4

OPS element of existing OPS frame.

| Element: | Element ID | Length | Element ID Extension | OPS Duration |
|---|---|---|---|---|
| Octets: | 1 | 1 | 1 | 1 |

Figure 4A:
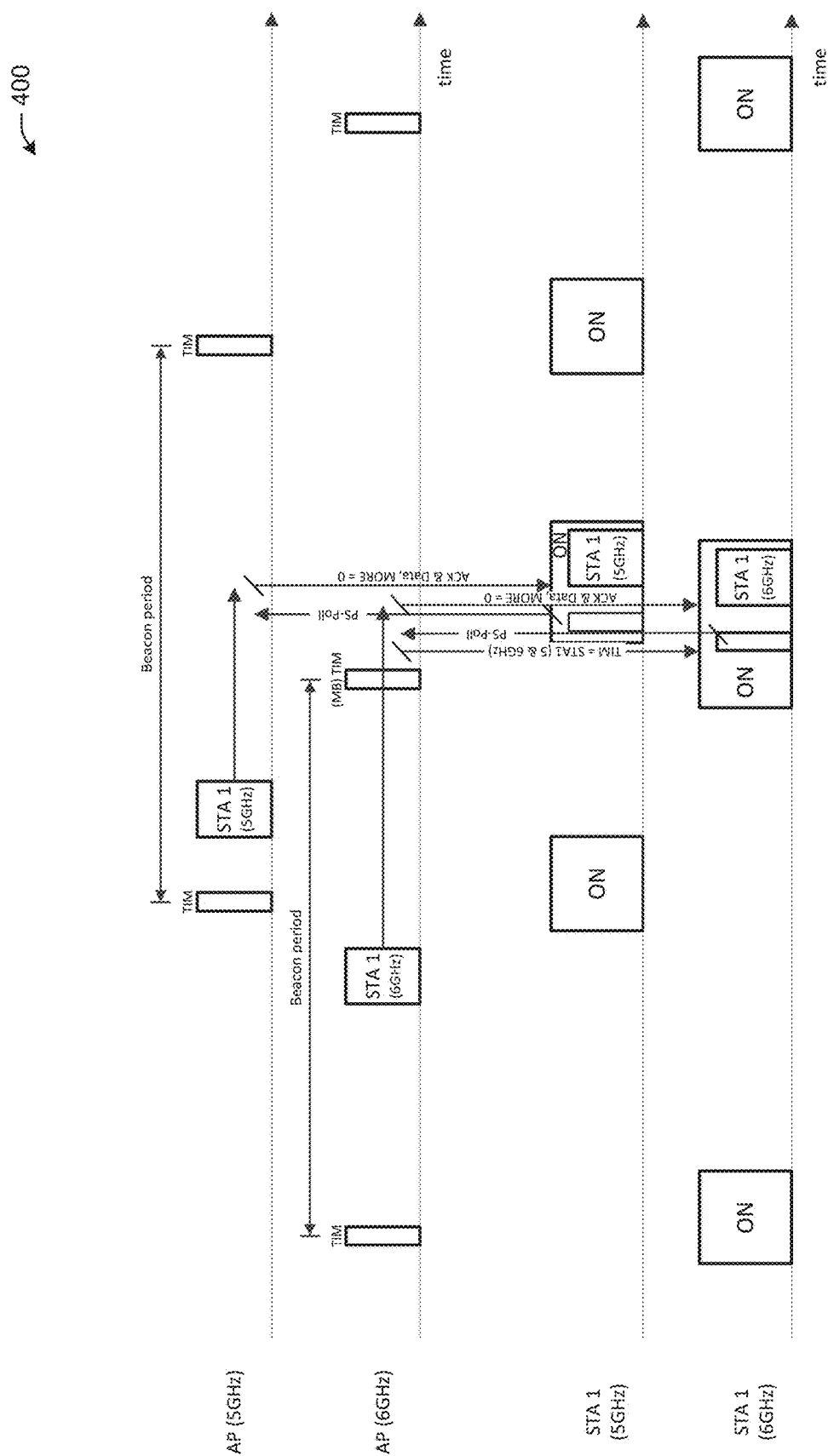
FIG. 4A depicts an illustrative schematic diagram for multi-band communications using polling, in accordance with one or more example embodiments of the present disclosure.

FIG. 4A depicts an illustrative schematic diagram 400 for multi-band communications using polling, in accordance with one or more example embodiments of the present disclosure.

FIG. 4A shows an example power save mode behavior in which an AP sends beacon frames that include multi-band (MB) TIM elements. In this example scenario, the beacon frame transmitted on a 6 GHz band includes (MB) TIM elements for 5 GHz and 6 GHz bands.

Once a 6 GHz transceiver at STA 1 processes the 5 GHz TIM element, then the STA 1 may wake up its 5 GHz transceiver. If the 5 GHz and 6 GHz TIM elements indicate the presence of data for the STA 1 from the AP on both bands, then both 5 GHz and 6 GHz transceivers at the STA 1 may send PS-Poll frames individually to retrieve data buffered at the AP.

While an example may allow for a multi-band TIM element to piggyback TIM element(s) for other frequency bands in a single (in-band) beacon frame, the STA 1 may still need to send separate PS-poll frames on each operating frequency band (i.e., 5 GHz and 6 GHz) in response to the 6 GHz beacon frame with TIM element(s) indicating that there is data buffered at the AP for both 5 GHz and 6 GHz bands.

In one or more embodiments, a multi-band PS-poll system may facilitate the use of multi-band PS-poll frame to allow a multi-band STA to send a single "multi-band" PS-poll frame to indicate which frequency band(s) are awake as a response to beacon (or OPS) frames with multi-band TIM element(s).

FIG. 4A provides example behavior of a power save mode (PSM) with a multi-band TIM for multi-band Wi-Fi operations using existing PS-poll frames individually transmitted on each band (e.g., 5 GHz and 6 GHz).

One scenario may include a multi-band-capable STA (denoted as "STA 1" in the figures) being associated with a multi-band-capable AP on both 5 GHz and 6-7 GHz bands. The STA 1 may have separate transceivers on 5 GHz and 6-7 GHz bands, and which operate independently of one other. Both 5 GHz and 6-7 GHz transceivers of the STA 1 may enter a power save mode independent of one another and periodically may wake up to listen for beacon frames from the AP. The AP may piggyback multiple MB TIM elements in a beacon frame.

Figure 4B:
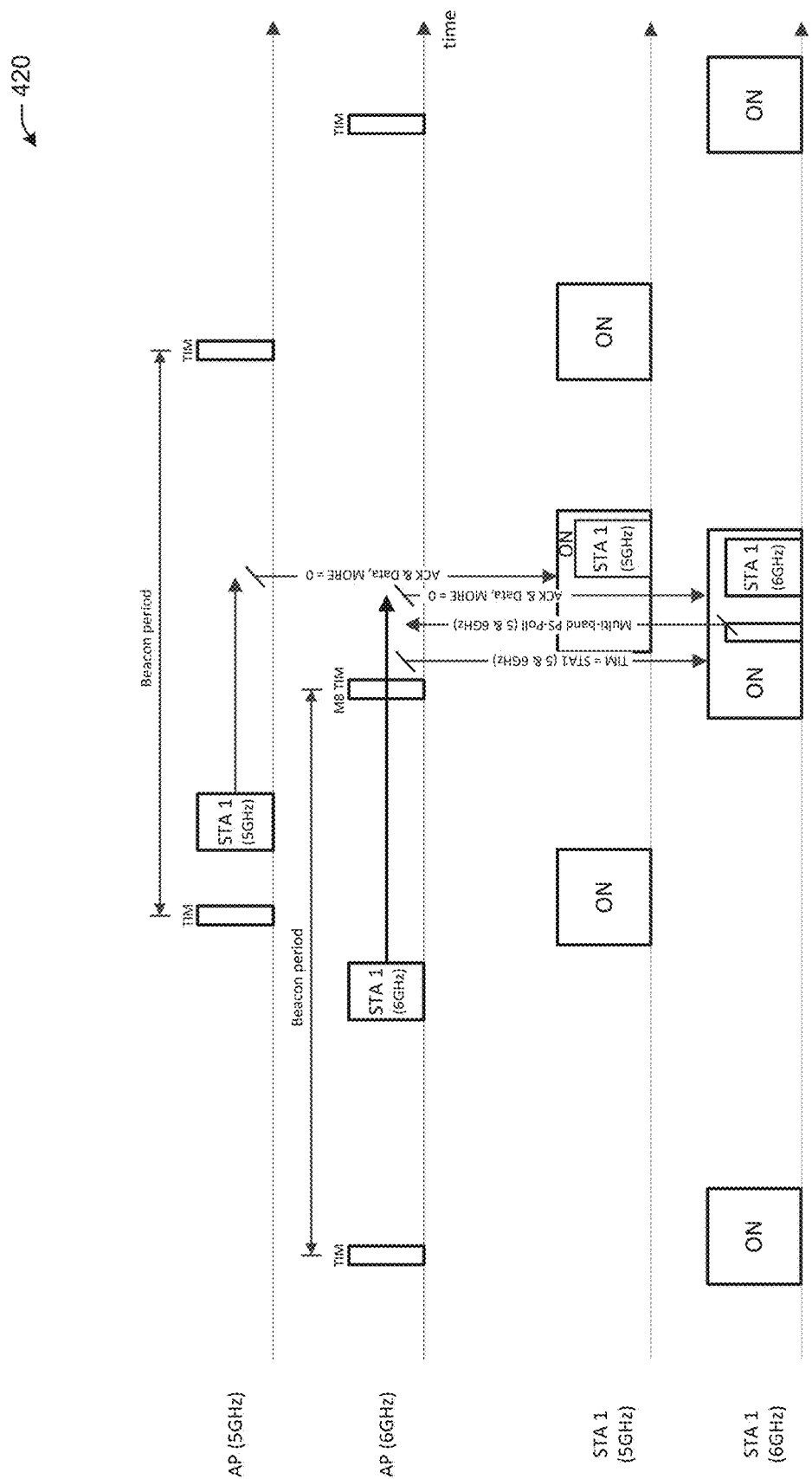
FIG. 4B depicts an illustrative schematic diagram for multi-band communications using polling, in accordance with one or more example embodiments of the present disclosure.

FIG. 4B depicts an illustrative schematic diagram 420 for multi-band communications using polling, in accordance with one or more example embodiments of the present disclosure.

FIG. 4B shows example behavior of a proposed multi-band (MB) PS-poll frame. As shown in FIG. 4B, when the AP sends a beacon frame with a TIM (e.g., the beacon frame is referred to as a TIM and a MB TIM in FIG. 4B) on a 6 GHz band, the AP may determine that there is (unicast) data buffered for STA 1 on both 5 GHz and 6 GHz bands. In a 6 GHz beacon frame sent by the AP, the AP may include a 6 GHz TIM element (e.g., for the current operating band) and also piggyback a 5 GHz MB TIM element to inform the STA 1 that there is data to transmit to the STA 1 on both frequency bands.

Once STA 1 receives the beacon frame on 6 GHz band, the STA 1 may decode both the 6 GHz TIM and 5 GHz MB TIM elements. If STA 1 determines that there is data to receive from the AP on both frequency bands, the STA 1 may prepare and send a "multi-band" PS-poll frame to retrieve the data not only on the 6 GHz band, but also on the 5 GHz band. The multi-band PS-poll frame may indicate that both frequency bands (i.e., 5 GHz and 6 GHz) are ready to receive data from the AP. Once the AP receives the MB PS-poll frame from the STA 1, the AP may prepare and send PPDUs on both frequency bands.

Meanwhile the 6 GHz transceiver of the STA 1 may wake up the 5 GHz transceiver of the STA 1 and may share the 5 GHz TIM element with the 5 GHz transceiver. Once the 5 GHz transceiver is woken up from a sleep state, the 5 GHz transceiver may prepare its RX chain(s) to receive data from the AP.

Figure 4C:
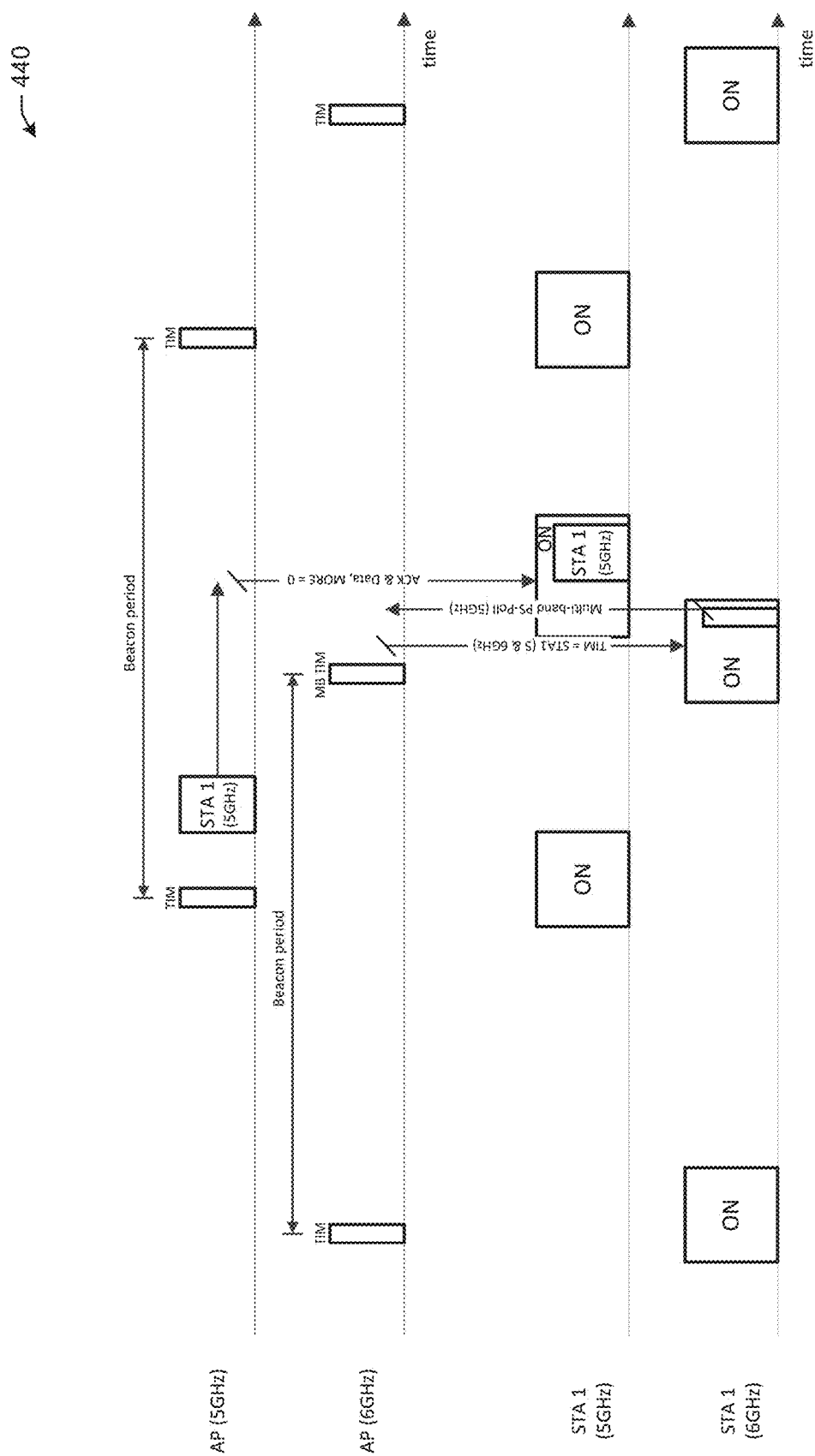
FIG. 4C depicts an illustrative schematic diagram for multi-band communications using polling, in accordance with one or more example embodiments of the present disclosure.

FIG. 4C depicts an illustrative schematic diagram 440 for multi-band communications using polling, in accordance with one or more example embodiments of the present disclosure.

In an example scenario, a MB TIM indicates that there is data to receive on other frequency band(s) (e.g., 5 GHz) and the STA 1 sends a multi-band PS-poll to indicate that the target frequency band(s) is awake to receive data buffered at the AP. For example, after receiving a MB TIM on the 6 GHz band indicating that there is data to receive on the 5 GHz band, the STA 1 sends a MB PS-poll indicating that 5 GHz is available to receive data. By doing this, the STA 1 may immediately send a MB PS-poll instead of waiting until the 5 GHz band wakes up from a doze state for packet transmission.

Figure 4D:
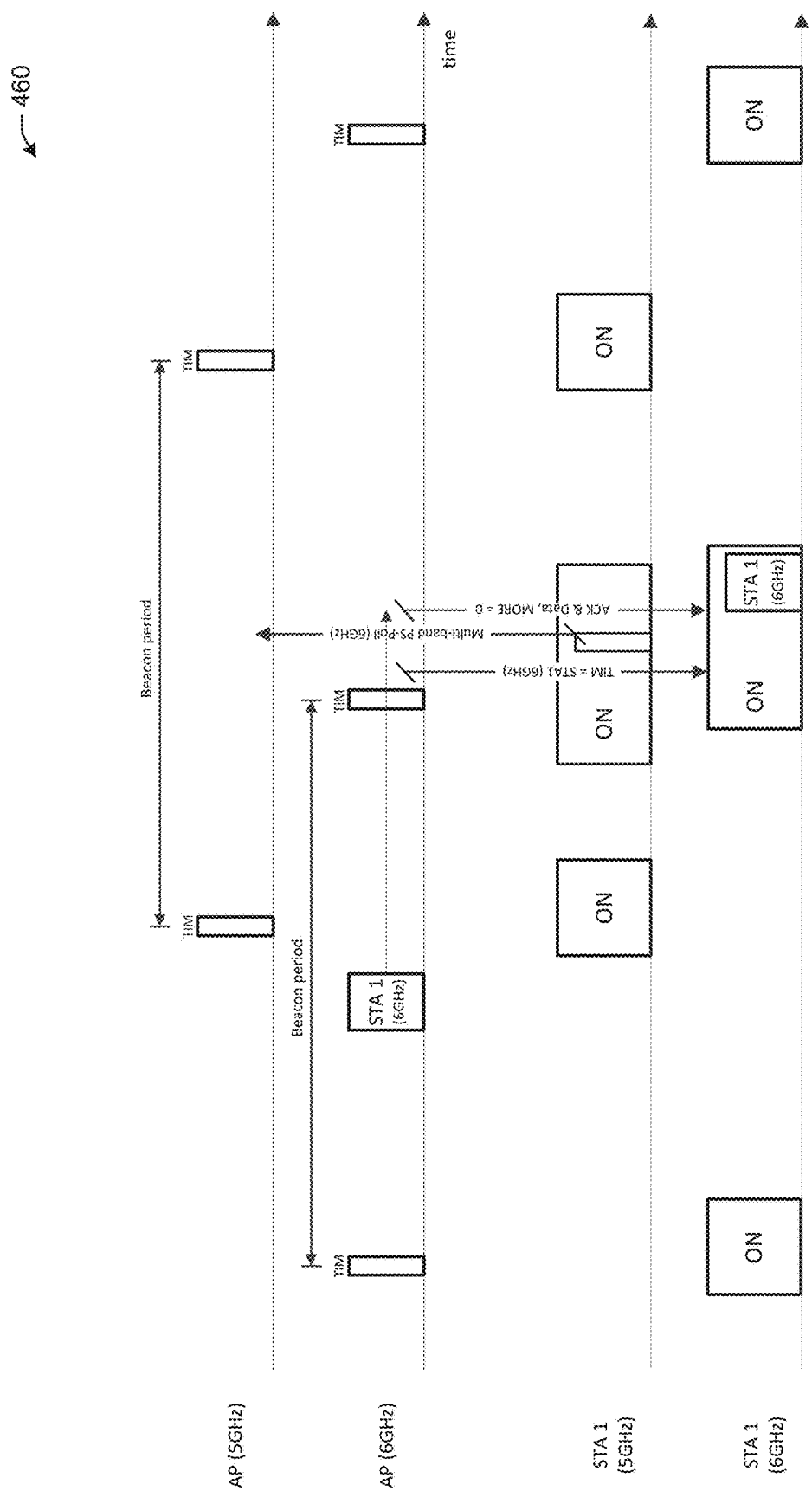
FIG. 4D depicts an illustrative schematic diagram for multi-band communications using polling, in accordance with one or more example embodiments of the present disclosure.

FIG. 4D depicts an illustrative schematic diagram 460 for multi-band communications using polling, in accordance with one or more example embodiments of the present disclosure.

In another scenario, the STA 1 receives a beacon (e.g., indicated as a TIM in FIG. 4D) indicating there is a data to receive from the AP on current operating band (e.g., 6 GHz), but the STA 1 sends a multi-band PS-poll on a different frequency band (e.g., 5 GHz) to minimize the latency in sending the PS-poll frame, as shown in FIG. 4D. For example, the channel on 5 GHz band becomes available first or no enhanced distributed channel access (EDCA) is possible on the 6 GHz band at the moment. By doing this, the STA 1 may minimize the latency in receiving the data from the AP.

Figure 4E:
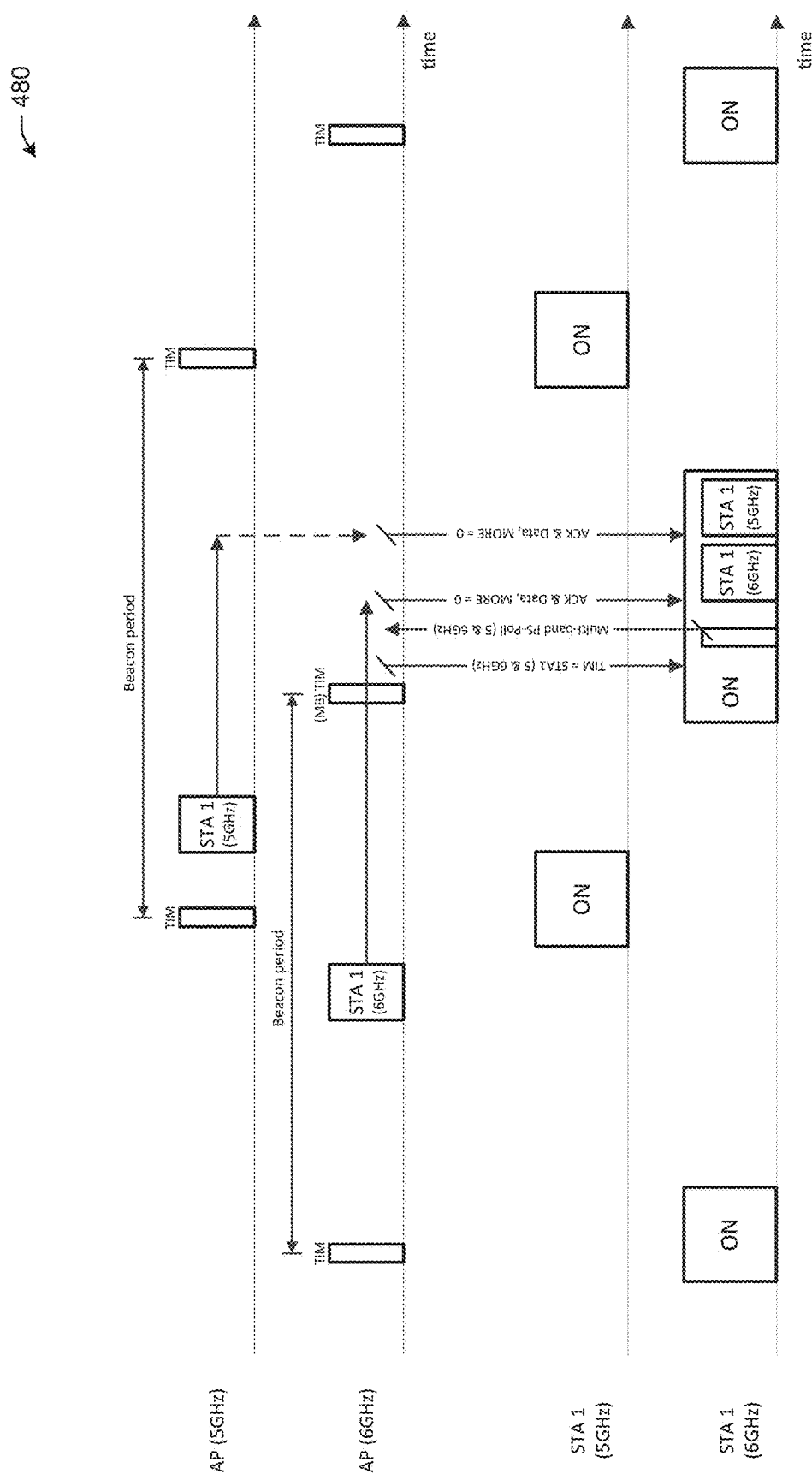
FIG. 4E depicts an illustrative schematic diagram for multi-band communications using polling, in accordance with one or more example embodiments of the present disclosure.

FIG. 4E depicts an illustrative schematic diagram 480 for multi-band communications using polling, in accordance with one or more example embodiments of the present disclosure.

In another example, the STA 1 may send a multi-band PS-poll indicating that the STA 1 may receive buffered data from the AP not only on the current operating band, but also data for other frequency bands. For example, when the STA 1 received a MB beacon frame (e.g., MB TIM) indicating there is data to receive from the AP on both 5 GHz and 6 GHz bands, the STA 1 may send a MB PS-poll indicating that the STA 1 may receive data on a current operating band (i.e., 6 GHz). In this situation, the AP may send the (unicast) data buffered for both 5 GHz and 6 GHz bands on the 6 GHz band.

By introducing multi-band PS-poll frame, the STA 1 only needs to send a single MB PS-poll frame instead of sending two (or more) PS-poll frames on each band, or may send a multi-band PS-poll to reduce latency in retrieving the data from the AP. The PS-poll frames may be useful especially when the AP sends multiple (MB) TIM elements in a single beacon (or OPS) frame in multi-band Wi-Fi communications.

Table 5 below shows an existing IEEE 802.11 PS-poll frame format.

TABLE 5

Existing PS-poll frame format.

| | Octets: | | | | |
|---|---|---|---|---|---|
| | 2 | 2 | 6 | 6 | 4 |
| Element: | Frame Control | ID | BSSID(RA) | TA | FCS |
| In MAC Header: | Yes | Yes | Yes | Yes | No |

Table 6 blow shows an example of the proposed multi-band PS-poll frame format with a new "Band" subfield indicating the available frequency bands (bitmap).

TABLE 6

Proposed multi-band PS-Poll frame format.

| | Octets: | | | | | |
|---|---|---|---|---|---|---|
| | 2 | 2 | 6 | 6 | 1 | 4 |
| Element: | Frame Control | ID | BSSID(RA) | TA | Band | FCS |
| In MAC Header: | Yes | Yes | Yes | Yes | Yes | No |

Figure 5A:
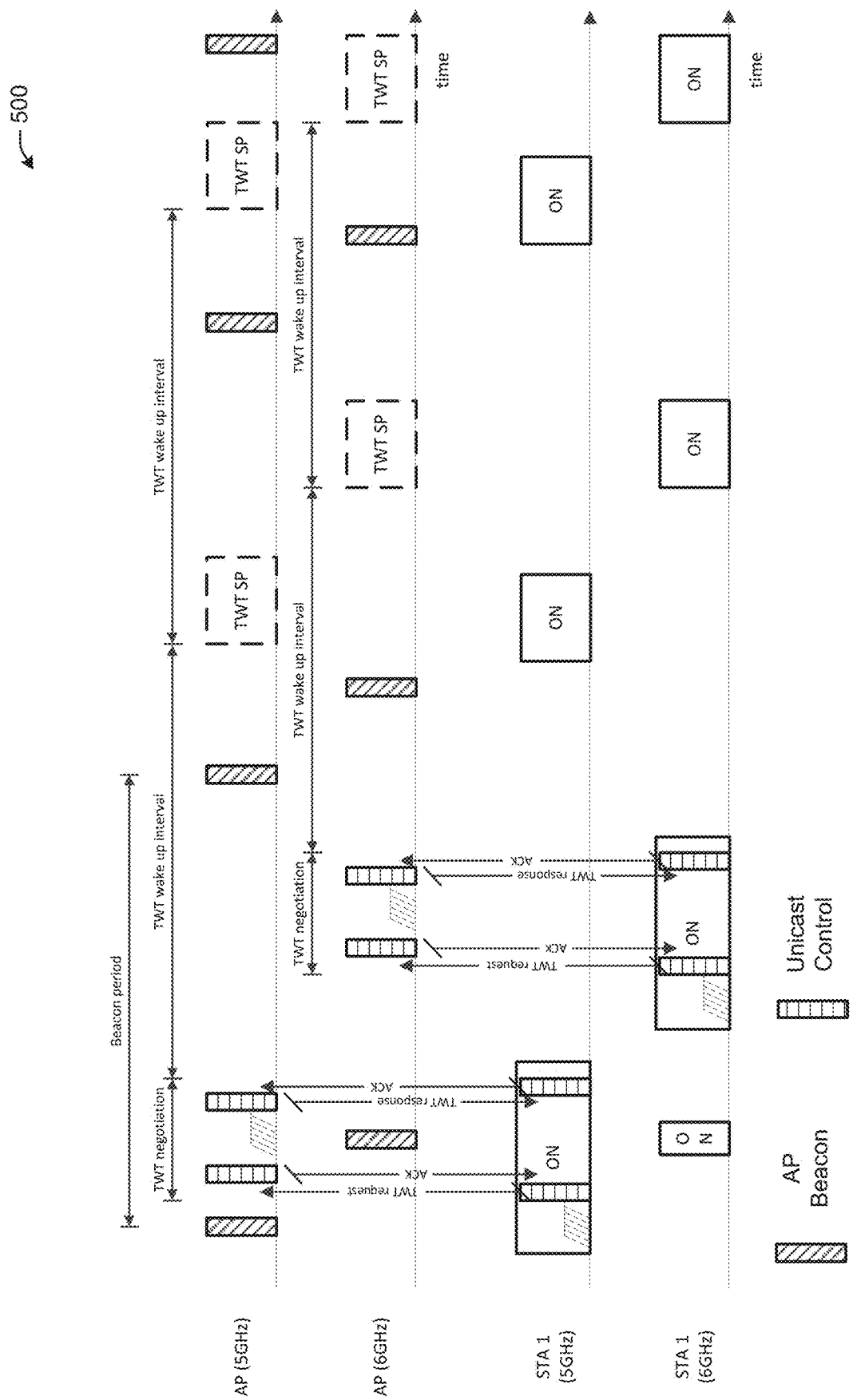
FIG. 5A depicts an illustrative schematic diagram for multi-band communications using target wake timing, in accordance with one or more example embodiments of the present disclosure.

FIG. 5A depicts an illustrative schematic diagram 500 for multi-band communications using target wake timing, in accordance with one or more example embodiments of the present disclosure.

FIG. 5A shows an example TWT-based power save behavior when an existing IEEE 802.11ax TWT mechanism is used in multi-band Wi-Fi communications, in which an AP and STAs are equipped with multiple transceivers operating on different frequency bands (e.g., 5 GHz and 6-7 GHz bands). The STA 1 may establish two separate individual TWT service period (SP) agreements on each band which are not aligned in time. As a result, a Wi-Fi radio of the STA 1 needs to be powered on for a longer period of time, and therefore may consume more power compared to a case in which the SPs are aligned across multiple bands.

Multi-band-capable STAs may use existing TWT mechanisms for multi-band Wi-Fi communication scenarios, e.g., IEEE EHT, by independently setting up TWT agreements on each band, e.g., 5 GHz and 6 GHz bands. However, as shown in FIG. 5A, the TWT service periods (SPs) on each band may not be aligned in time, which may increase total radio power consumption of the STA 1 and decrease potential platform level power saving opportunities. Separately negotiating TWT SPs on each band may incur more MAC-layer overhead due to TWT request/response frame exchanges on all the operating bands.

Figure 5B:
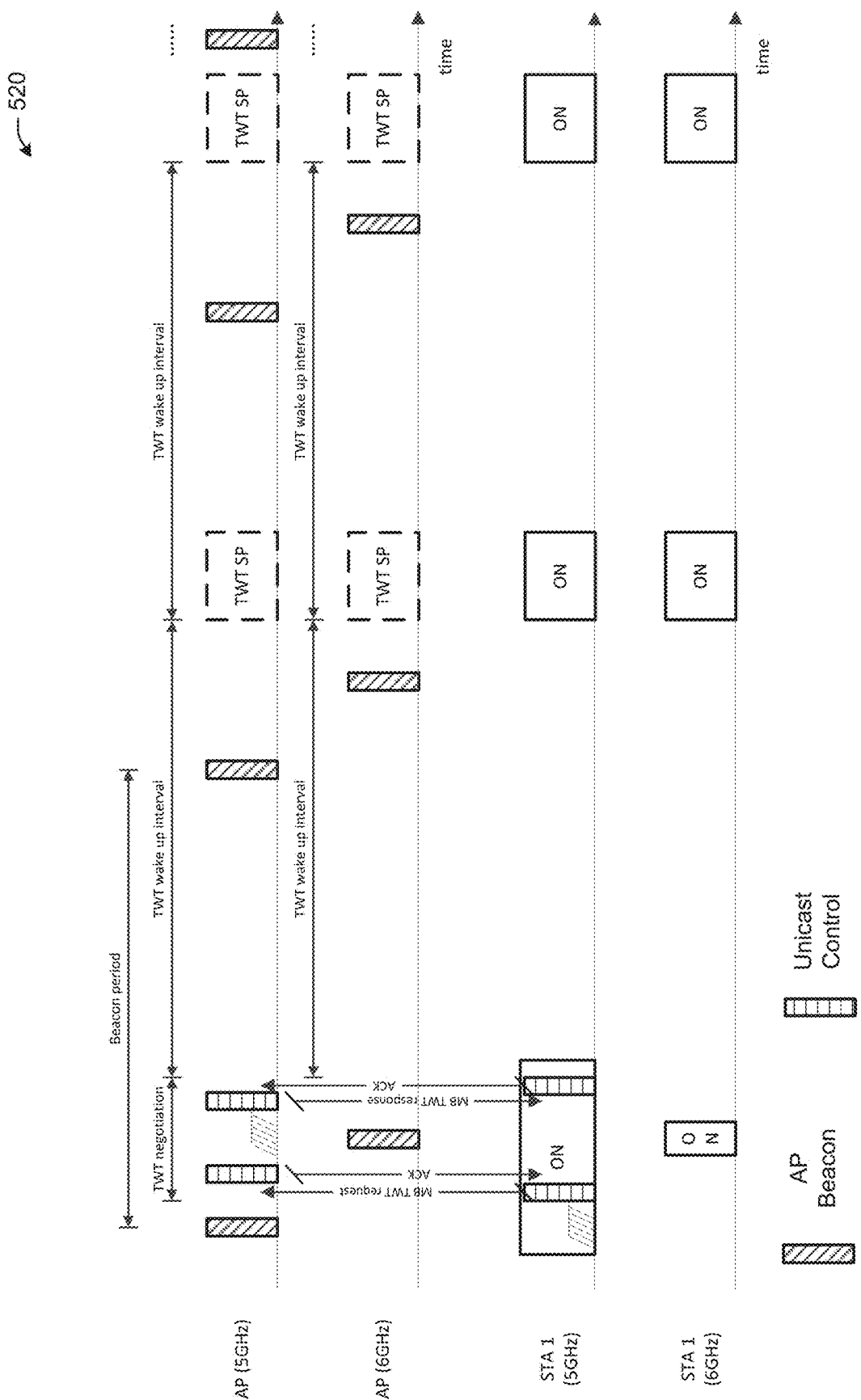
FIG. 5B depicts an illustrative schematic diagram for multi-band communications using target wake timing, in accordance with one or more example embodiments of the present disclosure.

FIG. 5B depicts an illustrative schematic diagram 520 for multi-band communications using target wake timing, in accordance with one or more example embodiments of the present disclosure.

FIG. 5B shows the proposed behavior of the multi-band TWT power save mechanism. A multi-band-capable STA (denoted as "STA 1" in the figure) is associated with a multi-band-capable AP on 5 GHz and 6-7 GHz bands. The STA 1 has separate transceivers on 5 GHz and 6-7 GHz bands, which operate independently. As shown in FIG. 5B, with the proposed multi-band TWT operation, the STA 1 may establish a common TWT service period (SP) for all the operating frequency bands with a single multi-band TWT request/response frame change.

Figure 5C:
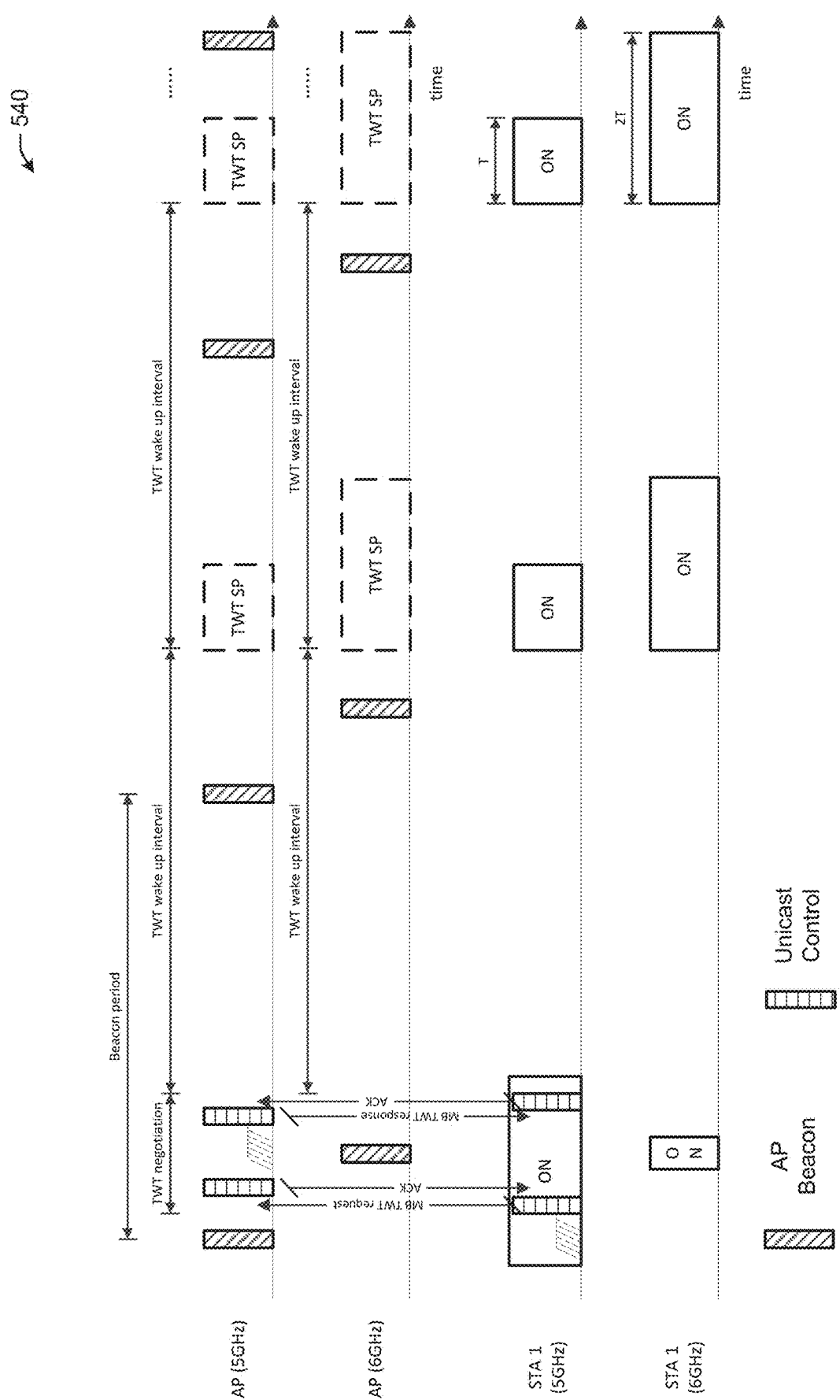
FIG. 5C depicts an illustrative schematic diagram for multi-band communications using target wake timing, in accordance with one or more example embodiments of the present disclosure.

FIG. 5C depicts an illustrative schematic diagram 540 for multi-band communications using target wake timing, in accordance with one or more example embodiments of the present disclosure.

In one example, the STA 1 (or the AP) may request to setup TWT SPs with different SP durations depending on requirements based on traffic load, etc. For example, TWT SP duration on 6 GHz band can be an integer multiple (e.g., 2×, 3×, etc.) of the TWT SP duration on 5 GHz band.

Figure 5D:
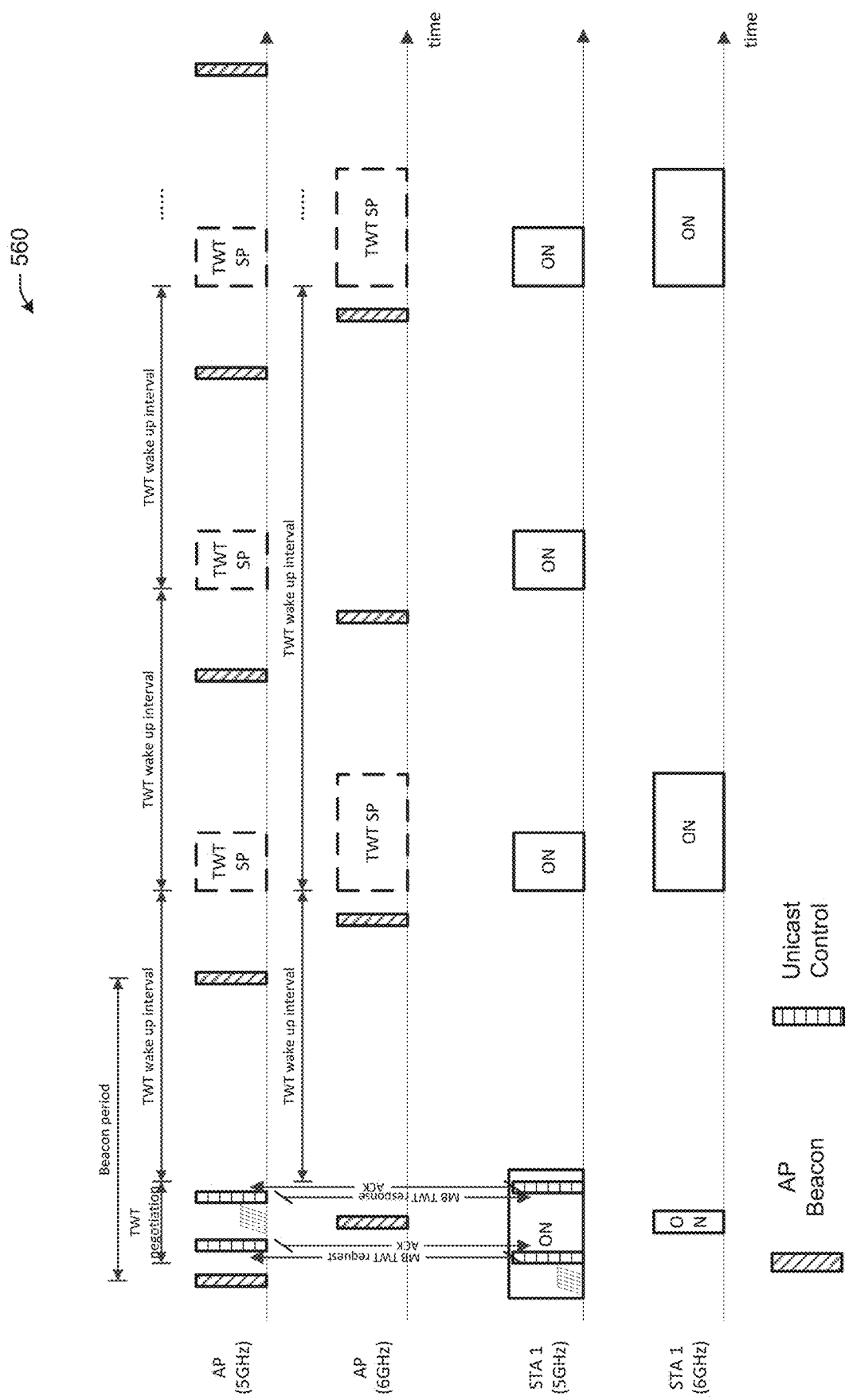
FIG. 5D depicts an illustrative schematic diagram for multi-band communications using target wake timing, in accordance with one or more example embodiments of the present disclosure.

FIG. 5D depicts an illustrative schematic diagram 560 for multi-band communications using target wake timing, in accordance with one or more example embodiments of the present disclosure.

In yet another example, the STA 1 (or the AP) can request to setup TWT SPs with different TWT wake up intervals depending on requirements based on traffic load, etc. For example, TWT wake up interval on the 6 GHz band can an integer multiple (e.g., 2×, 3×, etc.) of the TWT wake up interval on 5 GHz band.

Figure 5E:
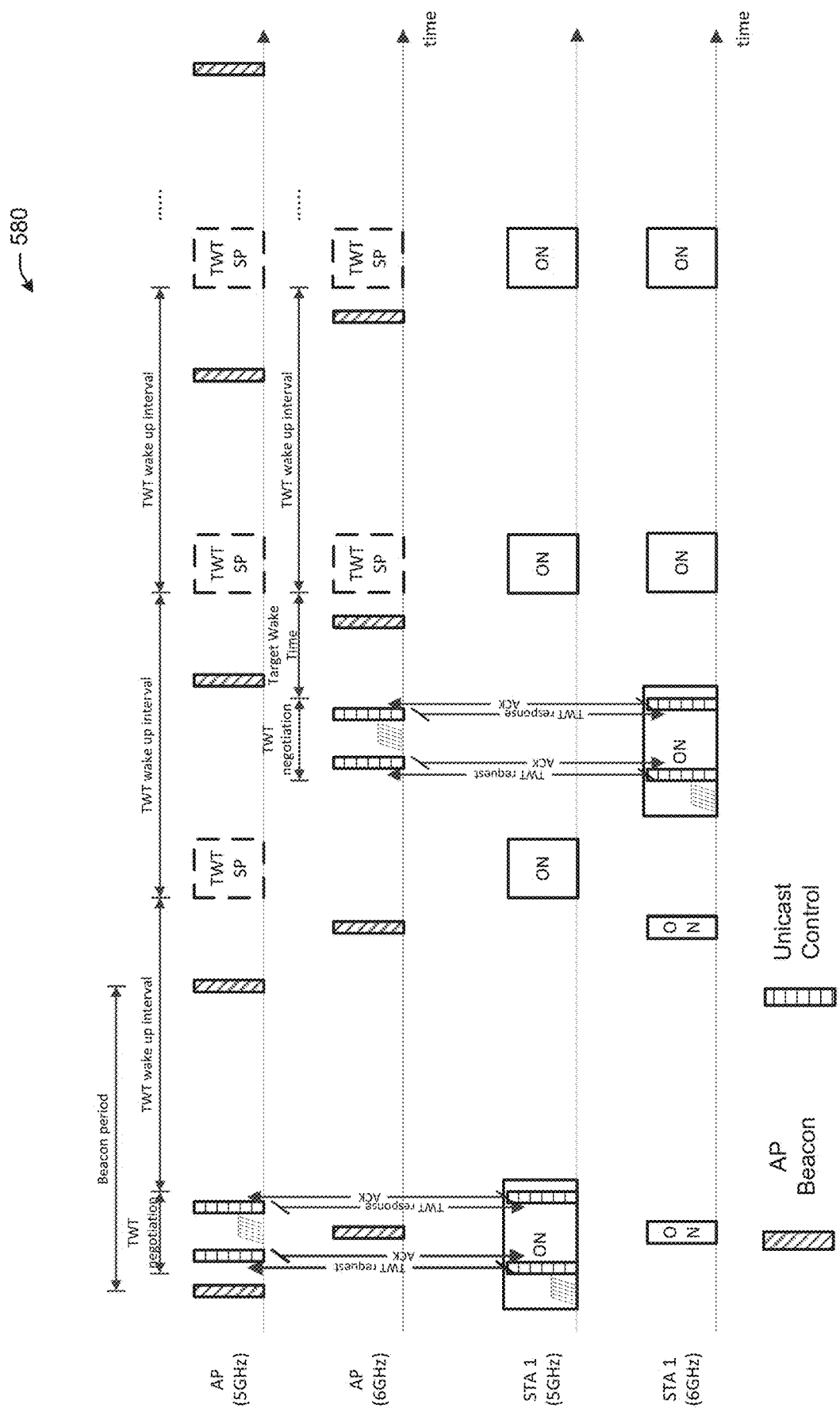
FIG. 5E depicts an illustrative schematic diagram for multi-band communications using target wake timing, in accordance with one or more example embodiments of the present disclosure.

FIG. 5E depicts an illustrative schematic diagram 580 for multi-band communications using target wake timing, in accordance with one or more example embodiments of the present disclosure.

FIG. 5E shows another example scenario where the STA 1 requests the AP to align new TWT SPs on the 6 GHz band to existing TWT SPs on the 5 GHz band. The STA 1 can indicate such alignment request in TWT request frame (e.g., by introducing a new 1-bit indication). Upon receiving the aligned TWT SP request, the AP can calculate a Target Wake Time for the next SP and TWT wake interval parameters for the 6 GHz band accordingly and indicate them in a TWT response frame.

Referring to FIG. 5A-5E, to enable such multi-band TWT operations, existing TWT elements and frame formats can be modified/extended to signal additional information. For example, if the STA 1 intends to setup common TWT SPs on multiple operating frequency bands, the STA 1 can indicate the target band and relevant parameters, such as TWT wake intervals, TWT SP durations, etc., in the TWT request frame with "multi-band" TWT element.

Table 7 below shows a TWT element format for a TWT frame.

TABLE 7

TWT element format.

| Element: | Element ID | Length | Control | TWT Parameter Information |
|---|---|---|---|---|
| Octets: | 1 | 1 | 1 | Variable |

Table 8 below shows an individual TWT Parameter Set field format (e.g., a format of the TWT parameter Information field of Table 7).

TABLE 8

Individual TWT Parameter field format.

| Element: | Request Type | Target Wake Time | TWT Group Assignment | Nominal Minimum TWT Wake Duration | TWT Wake Interval Mantissa | TWT Channel | NDP Paging (optional) |
|---|---|---|---|---|---|---|---|
| Octets: | 2 | 0 or 8 | 0, 3, or 9 | 1 | 2 | 1 | 0 or 4 |

Table 9 below shows a TWT Request Type field format (e.g., a format of the Request Type field of Table 8).

TABLE 9

Request Type field format.

| Bits: | B0 | B1-B3 | B4 | B5 | B6 | B7-B9 | B10-B14 | B15 |
|---|---|---|---|---|---|---|---|---|
| Element: | TWT Request | TWT Setup Command | Trigger | Implicit/ Last Broadcast Parameter Set | Flow Type | TWT Flow Identifier/ Broadcast TWT Recommendation | TWT Wake Interval Exponent | TWT Protection |

Figure 6A:
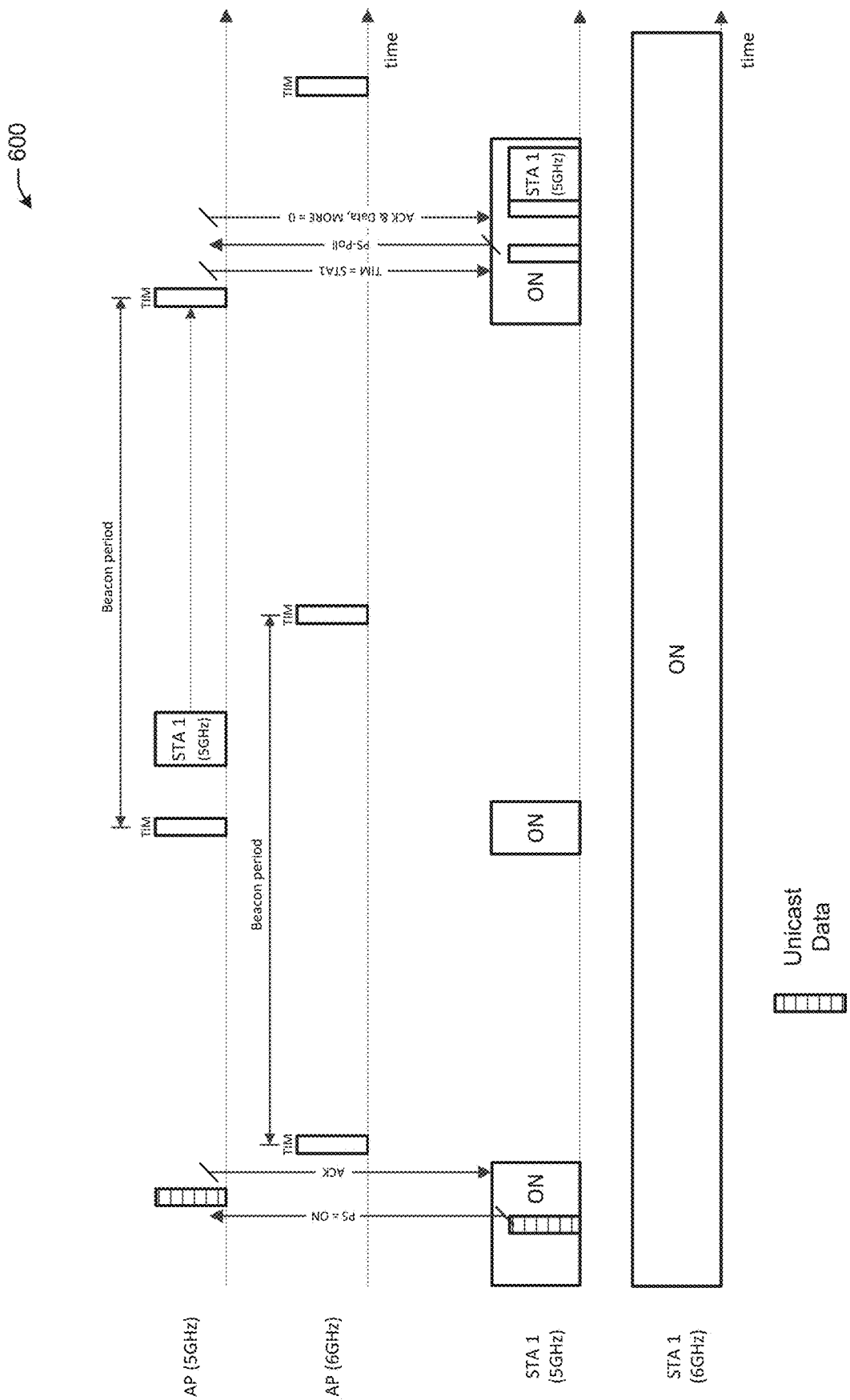
FIG. 6A depicts an illustrative schematic diagram for multi-band communications, in accordance with one or more example embodiments of the present disclosure.

FIG. 6A depicts an illustrative schematic diagram 600 for multi-band communications, in accordance with one or more example embodiments of the present disclosure.

In concurrent multi-band operations, the STA 1 may enter a power save mode on each frequency band independently based on traffic load, etc. For example, if the STA 1 is in power save mode on a 5 GHz band when the AP receives data to transmit to the STA 1 on the 5 GHz band, the STA 1 has to wait until the next beacon transmission time (or TBTT, Target Beacon Transmission Time) to transmit it even if the STA 1 is active on the 6 GHz band. Such multi-band-agnostic packet transmission behavior cannot fully leverage the presence of multiple operating frequency bands and radio resources and would result in sub-optimal performance in terms of latency and power.

One enhancement may allow a multi-band AP to opportunistically send a packet on other frequency band if the STA 1 is associated with the AP on multiple frequency bands. For example, the multi-band-capable STA 1 may be associated with the AP on both 5 GHz and 6 GHz bands. When the AP has data to send to the STA 1 on the 5 GHz band while the 5 GHz band radio of the STA 1 is in power save mode, the AP can send the data to the STA 1 on the 6 GHz band if the 6 GHz band radio of the STA 11 is ready to receive the data. This can be facilitated by introducing a signaling in PHY preamble indicating that the MPDU (or PSDU) is destined to a MAC on different frequency band.

Figure 6B:
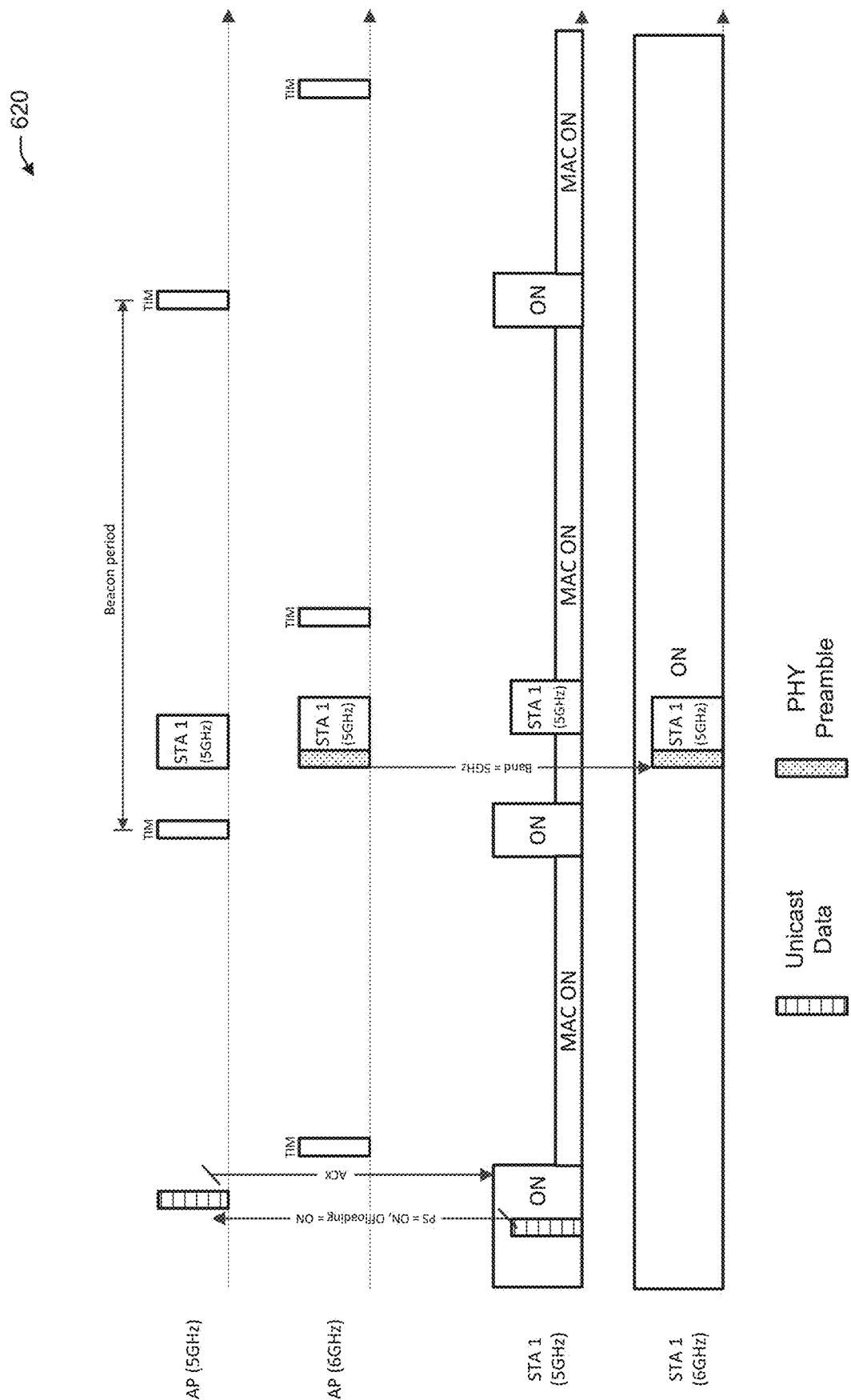
FIG. 6B depicts an illustrative schematic diagram for multi-band communications using offloading, in accordance with one or more example embodiments of the present disclosure.

FIG. 6B depicts an illustrative schematic diagram 620 for multi-band communications using offloading, in accordance with one or more example embodiments of the present disclosure.

FIG. 6B shows an example behavior of the proposed opportunistic packet transmission offloading in multi-band Wi-Fi communication scenarios. The proposed offloading mechanism may be applied to control and management frames (e.g., beacons).

Assuming that STA 1 is in a power save mode on the 5 GHz band with offloaded packet processing enabled (i.e., RF and PHY baseband powered off and MAC is powered on), and supports the "Multi-band (MB) Packet Offloading" capability, the AP does the following: When the AP receives data from destined to STA 1 on the 5 GHz band, the packet offloading decision module in the AP decides whether to transmit the data on the 6 GHz band based on multiple factors. For example, when the 6 GHz band transceiver at the STA 1 is in an active state and the remaining time until the next beacon frame transmission (or TBTT, Target Beacon Transmission Time) exceeds a pre-defined threshold. When the AP decides to send the data on the 6 GHz band, it (i) configures a PHY preamble (e.g., signaling field) to indicate the packet offloading and (ii) prepares and sends a packet(s) on the 6 GHz band. For example, the AP sets a 1-bit "Offloading" subfield to "1", and "Target Processing Band" subfield to indicate the target frequency band for packet processing. There can be more than two frequency bands, and there may be a need for more than 1-bit to represent the association from what band(s) to what band offloading. When the STA 1 enters a power save mode with offloaded packet processing enabled, the STA 1 may send a null data frame (i.e., Type subfield set to "10" and Subtype subfield set to "0100") with the "Power Management (B12)" subfield set to "1" and "Protected Frame (B14)" subfield set to "1" to indicate that its MAC processing module will be powered on for offloaded packet processing.

Figure 6C:
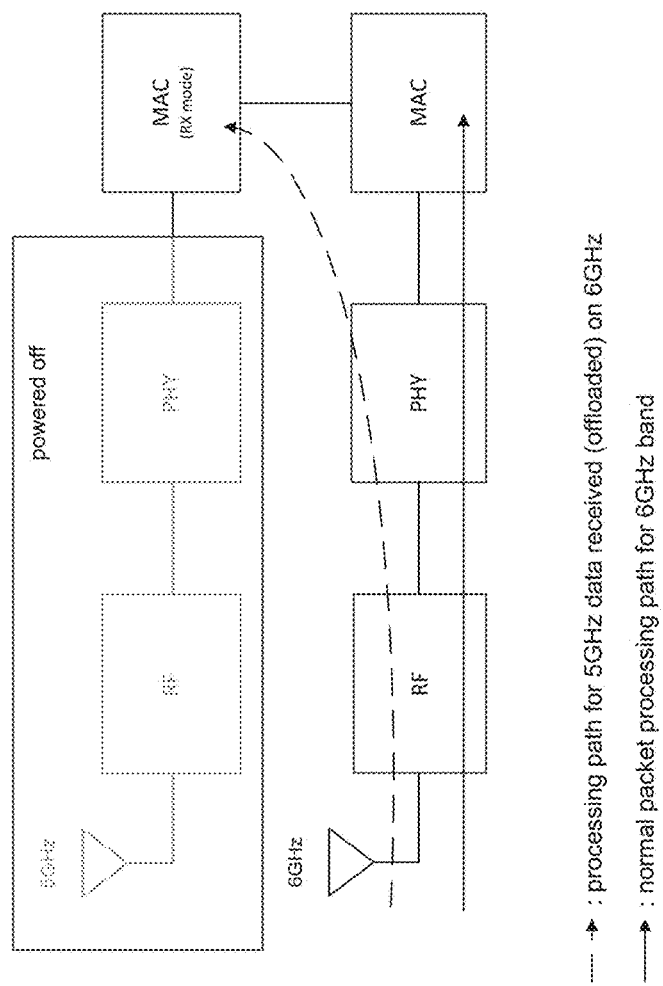
FIG. 6C depicts an illustrative schematic diagram for a multi-band communications architecture, in accordance with one or more example embodiments of the present disclosure.

FIG. 6C depicts an illustrative schematic diagram 640 for a multi-band communications architecture, in accordance with one or more example embodiments of the present disclosure.

When the STA 1 of FIGS. 6A and 6B receives a PPDU, the STA 1 evaluates the PHY preamble (e.g., signaling field). If a 1-bit "Offloading" subfield is set to "1", then the STA 1 evaluates a "Target Processing Band" subfield (e.g., bitmap). If the value of a "Target Processing Band" subfield is valid, then the PHY baseband processing module of decodes the packet and sends the decoded bits to the MAC processing module of the target band by issuing PHY-RXSTART indication (RXVECTOR). The MAC processing module in the target frequency band starts processing the incoming bits from the PHY. At the end of the PSDU processing, the PHY issues PHY-RXEND indication to the target MAC processing module.

Figure 6D:
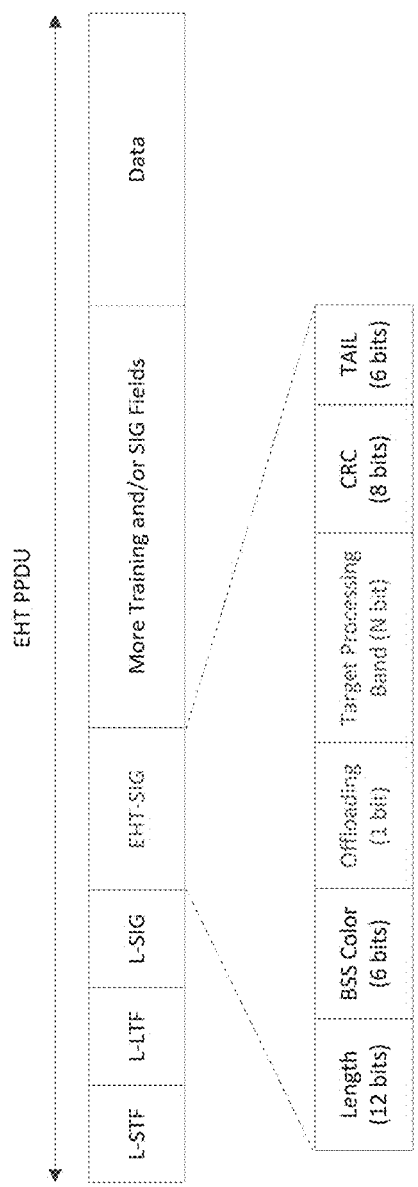
FIG. 6D depicts an illustrative frame format for multi-band communications, in accordance with one or more example embodiments of the present disclosure.

FIG. 6D depicts an illustrative frame format 660 for multi-band communications, in accordance with one or more example embodiments of the present disclosure.

FIG. 6D shows a simplified example PPDU frame format for Next-Gen Wi-Fi (i.e., IEEE EHT) including the proposed subfield in the EHT-SIG symbol, which includes "Offloading": A new 1-bit subfield can be defined to indicate whether the PPDU is offloaded to the current operating frequency band, and "Target Processing Band": A new subfield can be defined to indicate the target frequency band for MPDU (or PSDU) processing. The Target Processing Band subfield may have multiple bits depending on the number of frequency bands. The frame format 660 may represent a proposed PHY preamble format.

FIG. 6E depicts an illustrative frame format 680 for multi-band communications, in accordance with one or more example embodiments of the present disclosure.

When the STA 1 of FIGS. 6A and 6B enters power save mode with offloaded packet processing enabled, the STA 1 will send a null data frame (i.e., Type subfield set to "10" and Subtype subfield set to "0100") with the "Power Management (B12)" subfield set to "1" and "Protected Frame (B14)" subfield set to "1" to indicate that the MAC processing module will be powered on for offloaded packet processing, as shown in FIG. 6E and Table 10 below.

A proposed use of "Protected Frame (B14)" subfield for indicating the PSM with offloaded MPDU (or PSDU) processing enabled is one example for encoding rules. Other subfields or new frame formats can be used to indicate such PSM in next-generation Wi-Fi standards.

After sending the null data packet indicating PSM with multi-band offloaded packet processing enabled, the STA 1 turns off the RF and PHY baseband circuitry while the MAC processing module is in active RX state, as shown in FIG. 6C.

When the STA receives a PPDU, it evaluates the PHY preamble (e.g., signaling field). If the 1-bit "Offloading" subfield is set to "1", then it checks the "Target Processing Band" subfield (e.g., bitmap). If the value of "Target Processing Band" subfield is valid, then the PHY baseband processing module decodes the packet and sends the decoded bits to the MAC processing module of the target band by issuing PHY-RXSTART indication (RXVECTOR). The MAC processing module in the target frequency band starts processing the incoming bits from the PHY. At the end of the PSDU processing, the PHY issues PHY-RXEND indication to the target MAC processing module.

Table 10 below shows an example encoding rule for power save mode with MB packet processing offloading capability.

TABLE 10

Example encoding rule for power save mode
with MB packet processing offloading capability.

| Type (B2B3) | Subtype (B4-B7) | Power Management (B12) | Protected Frame (B14) | Description |
|---|---|---|---|---|
| 10 | 0100 | 1 | 0 | STA is entering power save mode w/o packet processing offloading enabled |
| 10 | 0100 | 1 | 1 | STA is entering power save mode w/packet processing offloading enabled; MAC processing module will be powered on and stay in RX mode for inputs from PHY baseband processing modules on other frequency bands |

Figure 6F:
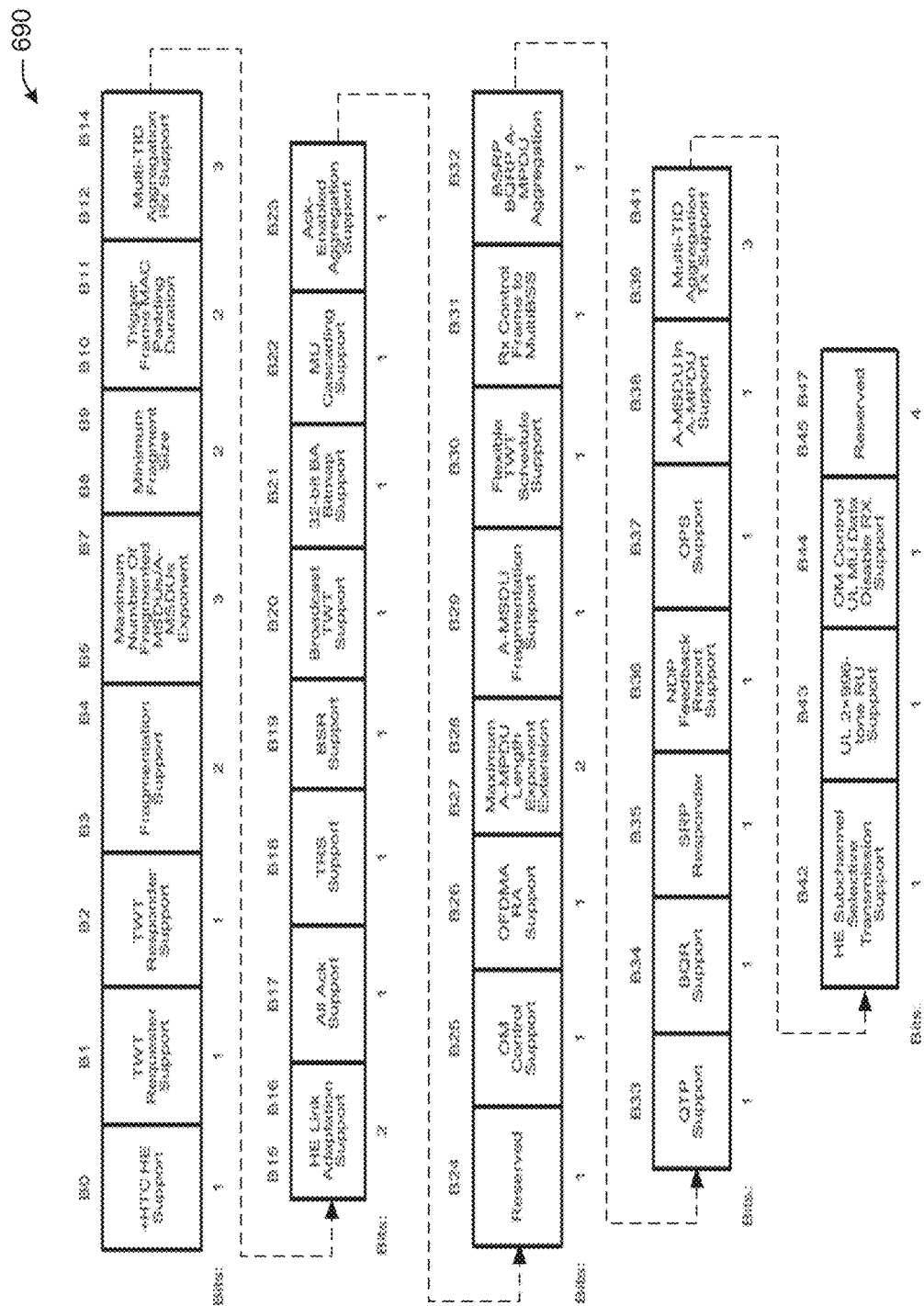
FIG. 6F depicts an illustrative frame format for multi-band communications, in accordance with one or more example embodiments of the present disclosure.

FIG. 6F depicts an illustrative frame format 690 for multi-band communications, in accordance with one or more example embodiments of the present disclosure.

To support the proposed opportunistic packet offloading, STAs should be able to (i) detect the "offloading" indication in the PHY preamble, and (ii) send the decoded bits to the target MAC processing module. STAs need to indicate such capability as part of the Capability Information Exchange during (Re)Association procedure. A new "Multi-band Packet Offloading Support" subfield can be defined in MAC Capabilities Information field by repurposing 1-bit from the "Reserved (B45-B47)" subfield. FIG. 6F shows the HE MAC Capabilities Information field as a reference.

Figure 7A:
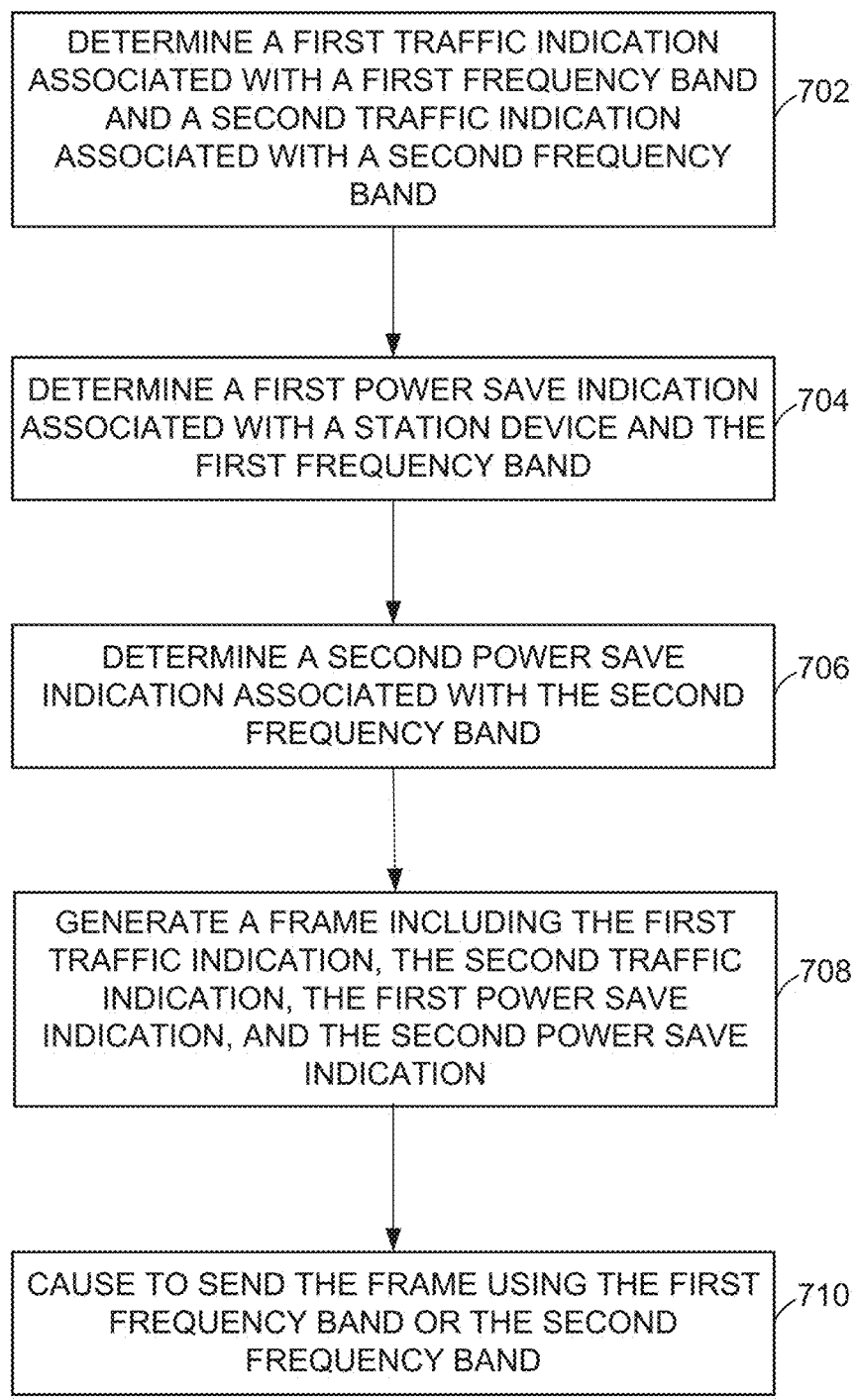
FIG. 7A illustrates a flow diagram of illustrative process for an illustrative multi-band opportunistic power save system, in accordance with one or more example embodiments of the present disclosure.

FIG. 7A illustrates a flow diagram of illustrative process 700 for an illustrative multi-band opportunistic power save system, in accordance with one or more example embodiments of the present disclosure.

At block 702, a device (e.g., the AP 102 of FIG. 1, the AP of FIG. 3A-3C) may determine respective traffic indications (e.g., TIMs) for respective frequency bands (e.g., a first TIM for a 5 GHz band and a second TIM for a 6 GHz band). The respective traffic indications may include a first traffic indication and a second traffic indication, and may include more than two traffic indications. When a respective traffic indication includes an indication of a STA, the traffic indication may indicate that the AP has data to send to the STA. When the STA is absent from a respective TIM for a frequency band, such may indicate to the STA that the STA may enter a power save mode for a time period.

At block 704, the device may determine a first power save indication (e.g., OPS duration) associated with the STA and the first frequency band. At block 706, the device may determine a second power save indication (e.g., OPS duration) associated with the STA and the second frequency band. Any TIM for a frequency band may correspond to a respective power save indication for the frequency band. When a respective traffic indication includes an indication of a STA, the traffic indication may indicate that the AP has data to send to the STA during a time period indicated by the power save indication. When the STA is absent from a respective TIM for a frequency band, such may indicate to the STA that the STA may enter a power save mode for a time period indicated by the power save indication.

At block 708, the device may generate a frame (e.g., an MB OPS frame) including the first traffic indication, the second traffic indication, the first power save indication, and the second power save indication. For any frequency band indicated by the frame, the frame may include respective traffic indications and power save indications with an indication of the frequency band for which the traffic indications and power save indications correspond.

At block 710, the device may send (e.g., the processing circuitry of the device may cause the device to send) the frame using the first or second frequency band. For example, when the STA is in a power save mode in one frequency band because a previously sent frame from the device indicated that the STA had no traffic during a time period, the device may send the frame in another frequency band to indicate (e.g., using a power save indication) that the STA either may remain in the power save mode in the frequency band or should wake up early in the frequency band. When the STA wakes up early, the STA may send a poll (e.g., PS-poll) to the device, and in response, the device may send data (e.g., unicast data) to the STA in the frequency band. When the frame indicates using a power save indication that the STA may remain in a power save mode in another frequency band, the STA may extend its power save mode in the indicated frequency band.

Figure 7B:
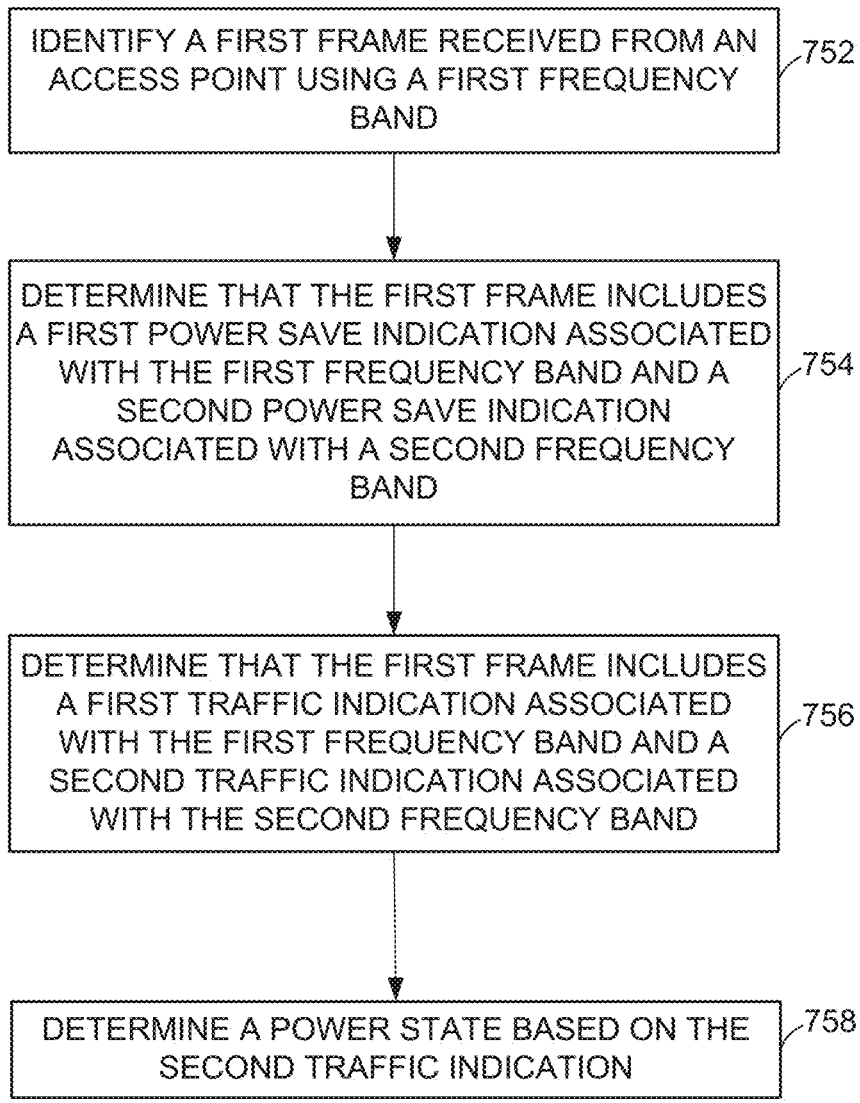
FIG. 7B illustrates a flow diagram of illustrative process for an illustrative multi-band opportunistic power save system, in accordance with one or more example embodiments of the present disclosure.

FIG. 7B illustrates a flow diagram of illustrative process 750 for an illustrative multi-band opportunistic power save system, in accordance with one or more example embodiments of the present disclosure.

At block 752, a device (e.g., the one or more user devices 120 of FIG. 1, the STA 1 of FIG. 3A-3C) may identify a frame (e.g., a MB OPS frame) received from an AP (e.g., the AP 102 of FIG. 1, the AP of FIG. 3A-3C). The device may be in a power save mode in one frequency band and may receive the frame in another frequency band while actively listening in the other frequency band.

At block 754, the device may determine that the frame includes respective power save indications (e.g., OPS durations) for respective frequency bands, such as a first power save indication for the first frequency band and a second power save indication for a second frequency band (e.g., a frequency band in which the device is using a power save mode). The power save indications may indicate time periods during which the device may be in a power save mode in the corresponding frequency band when the device determines that the AP has no traffic to send to the device during the time period.

At block 756, the device may determine that the frame includes respective traffic indications (e.g., TIMs) for the corresponding frequency bands. The traffic indications may include a first traffic indication for the first frequency band and a second traffic indication for the second frequency band. When a traffic indication includes an indication of the device, the device may determine that the AP has traffic to send to the device, and may wake up in the corresponding frequency band to receive the traffic.

At block 758, the device may determine a power state (e.g., power save mode or active mode) based on the respective traffic indications for the corresponding frequency bands. When the device is absent from a traffic indication, the device may determine that the AP has no data to send to the device during a time period indicated by the respective power save indication for the corresponding frequency band, and the device may use a power save mode in the frequency band during the time period. When the device is in a power save mode in another frequency band and a traffic indication for the frequency band indicates that the AP has data for the device in the frequency band, the device may wake up early in the frequency band, may send a poll (e.g., PS-poll) to the AP, and may receive the data from the AP. When the device is in a power save mode in another frequency band and a traffic indication for the frequency band indicates that the AP does not have data for the device in the frequency band, the device may extend its power save mode in the frequency band.

It is understood that the above descriptions are for purposes of illustration and are not meant to be limiting.

FIG. 8 shows a functional diagram of an exemplary communication station 800, in accordance with one or more example embodiments of the present disclosure. In one embodiment, FIG. 8 illustrates a functional block diagram of a communication station that may be suitable for use as an AP 102 (FIG. 1) or a user device 120 (FIG. 1) in accordance with some embodiments. The communication station 800 may also be suitable for use as a handheld device, a mobile device, a cellular telephone, a smartphone, a tablet, a netbook, a wireless terminal, a laptop computer, a wearable computer device, a femtocell, a high data rate (HDR) subscriber station, an access point, an access terminal, or other personal communication system (PCS) device.

The communication station YY00 may include communications circuitry 802 and a transceiver 810 for transmitting and receiving signals to and from other communication stations using one or more antennas 801. The communications circuitry 802 may include circuitry that can operate the physical layer (PHY) communications and/or medium access control (MAC) communications for controlling access to the wireless medium, and/or any other communications layers for transmitting and receiving signals. The communication station 800 may also include processing circuitry 806 and memory 808 arranged to perform the operations described herein. In some embodiments, the communications circuitry 802 and the processing circuitry 806 may be configured to perform operations detailed in the above figures, diagrams, and flows.

In accordance with some embodiments, the communications circuitry 802 may be arranged to contend for a wireless medium and configure frames or packets for communicating over the wireless medium. The communications circuitry 802 may be arranged to transmit and receive signals. The communications circuitry 802 may also include circuitry for modulation/demodulation, upconversion/downconversion, filtering, amplification, etc. In some embodiments, the processing circuitry 806 of the communication station 800 may include one or more processors. In other embodiments, two or more antennas 801 may be coupled to the communications circuitry 802 arranged for sending and receiving signals. The memory 808 may store information for configuring the processing circuitry 806 to perform operations for configuring and transmitting message frames and performing the various operations described herein. The memory 808 may include any type of memory, including non-transitory memory, for storing information in a form readable by a machine (e.g., a computer). For example, the memory 808 may include a computer-readable storage device, read-only memory (ROM), random-access memory (RAM), magnetic disk storage media, optical storage media, flash-memory devices and other storage devices and media.

In some embodiments, the communication station 800 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 800 may include one or more antennas 801. The antennas 801 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 800 may include one or more of a keyboard, a display, a non-volatile memory port, multiple antennas, a graphics processor, an application processor, speakers, and other mobile device elements. The display may be an LCD screen including a touch screen.

Although the communication station 800 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 800 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 800 may include one or more processors and may be configured with instructions stored on a computer-readable storage device.

FIG. 9 illustrates a block diagram of an example of a machine 900 or system upon which any one or more of the techniques (e.g., methodologies) discussed herein may be performed. In other embodiments, the machine 900 may operate as a standalone device or may be connected (e.g., networked) to other machines. In a networked deployment, the machine 900 may operate in the capacity of a server machine, a client machine, or both in server-client network environments. In an example, the machine 900 may act as a peer machine in peer-to-peer (P2P) (or other distributed) network environments. The machine 900 may be a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 900 may include a hardware processor 902 (e.g., a central processing unit (CPU), a graphics processing unit (GPU), a hardware processor core, or any combination thereof), a main memory 904 and a static memory 906, some or all of which may communicate with each other via an interlink (e.g., bus) 908. The machine 900 may further include a power management device 932, a graphics display device 910, an alphanumeric input device 912 (e.g., a keyboard), and a user interface (UI) navigation device 914 (e.g., a mouse). In an example, the graphics display device 910, alphanumeric input device 912, and UI navigation device 914 may be a touch screen display. The machine 900 may additionally include a storage device (i.e., drive unit) 916, a signal generation device 918 (e.g., a speaker), an enhanced power save device 919, a network interface device/transceiver 920 coupled to antenna(s) 930, and one or more sensors 928, such as a global positioning system (GPS) sensor, a compass, an accelerometer, or other sensor. The machine 900 may include an output controller 934, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)).

The storage device 916 may include a machine readable medium 922 on which is stored one or more sets of data structures or instructions 924 (e.g., software) embodying or utilized by any one or more of the techniques or functions described herein. The instructions 924 may also reside, completely or at least partially, within the main memory 904, within the static memory 906, or within the hardware processor 902 during execution thereof by the machine 900. In an example, one or any combination of the hardware processor 902, the main memory 904, the static memory 906, or the storage device 916 may constitute machine-readable media.

The enhanced power save device 919 may carry out or perform any of the operations and processes (e.g., process 700 of FIG. 7A, process 750 of FIG. 7B) described and shown above.

It is understood that the above are only a subset of what the enhanced power save device 919 may be configured to perform and that other functions included throughout this disclosure may also be performed by enhanced power save device 919.

While the machine-readable medium 922 is illustrated as a single medium, the term "machine-readable medium" may include a single medium or multiple media (e.g., a centralized or distributed database, and/or associated caches and servers) configured to store the one or more instructions 924.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 900 and that cause the machine 900 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 924 may further be transmitted or received over a communications network 926 using a transmission medium via the network interface device/transceiver 920 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®), IEEE 802.16 family of standards known as WiMax®), IEEE 802.15.4 family of standards, and peer-to-peer (P2P) networks, among others. In an example, the network interface device/transceiver 920 may include one or more physical jacks (e.g., Ethernet, coaxial, or phone jacks) or one or more antennas to connect to the communications network 926. In an example, the network interface device/transceiver 920 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 900 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

The term "access point" (AP) as used herein may be a fixed station. An access point may also be referred to as an access node, a base station, an evolved node B (eNodeB), or some other similar terminology known in the art. An access terminal may also be called a mobile station, user equipment (UE), a wireless communication device, or some other similar terminology known in the art. Embodiments disclosed herein generally pertain to wireless networks. Some embodiments may relate to wireless networks that operate in accordance with one of the IEEE 802.11 standards.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

The following examples pertain to further embodiments.

Example 1 may be a device comprising memory and processing circuitry configured to: determine a first traffic indication associated with a first frequency band and a second traffic indication associated with a second frequency band; determine a first power save indication associated with a station device and the first frequency band; determine a second power save indication associated with the station device and the second frequency band; generate a frame comprising the first traffic indication, the second traffic indication, the first power save indication, and the second power save indication; and cause to send the frame using the first frequency band.

Example 2 may include the device of example 1 and/or some other example herein, wherein the frame is a first opportunistic power save (OPS) frame, the processing circuitry is further configured to cause to send, to the station device and using the first frequency band, a second OPS frame, wherein the station device is absent from the first traffic indication, and wherein the second OPS frame is sent before the first OPS frame.

Example 3 may include the device of example 2 and/or some other example herein, wherein the second OPS frame comprises a third power save indication associated with the station device and the first frequency band, and wherein the first OPS frame is sent during a time period associated with the third power save indication and using the second frequency band.

Example 4 may include the device of example 3 and/or some other example herein, wherein the second OPS frame further comprises a third traffic indication associated with the first frequency band.

Example 5 may include the device of example 3 and/or some other example herein, wherein the first power save indication is associated with a second time period that directly follows the time period.

Example 6 may include the device of example 3 and/or some other example herein, wherein the first traffic indication indicates data to be sent to the station device before expiration of the time period.

Example 7 may include the device of example 6 and/or some other example herein, wherein the processing circuitry is further configured to: identify a power save poll received from the station device; and cause to send the data to the station device.

Example 8 may include the device of example 1 and/or some other example herein, wherein the station device is absent from the first traffic indication and the second traffic indication.

Example 9 may include the device of example 1 and/or some other example herein, wherein the frame is a multi-band frame sent using the second frequency band.

Example 10 may include the device of example 1 and/or some other example herein, further comprising a transceiver configured to transmit and receive wireless signals.

Example 11 may include the device of example 10 and/or some other example herein, further comprising one or more antennas coupled to the transceiver.

Example 12 may include a non-transitory computer-readable medium storing computer-executable instructions which when executed by one or more processors result in performing operations comprising: identifying, by a station device, a first frame received from an access point device, wherein the first frame is received using a first frequency band; determining that the first frame comprises a first power save indication associated with the first frequency and a second power save indication associated with a second frequency; determining that the first frame comprises a first traffic indication associated with the first frequency band and a second traffic indication associated with the second frequency band; and determining a power state based on the second traffic indication.

Example 13 may include the non-transitory computer-readable medium of example 12 and/or some other example herein, the operations further comprising: determining that the station device is absent from the second traffic indication, wherein the power state is based on the absence; and causing the station device to enter a power save mode during a time period associated with the second power save indication.

Example 14 may include the non-transitory computer-readable medium of example 12 and/or some other example herein, the operations further comprising: determining that the second traffic indication comprises an indication of the station device, wherein the power state is based on the indication of the station device; and causing the station device to activate a radio during a time period associated with the second power save indication.

Example 15 may include the non-transitory computer-readable medium of example 12 and/or some other example herein, wherein the first frame is a first opportunistic power save (OPS) frame, the operations further comprising identifying a second OPS frame received from the access point device using the first frequency band, wherein the station device is absent from the first traffic indication, and wherein the second OPS frame is received before the first OPS frame.

Example 16 may include the non-transitory computer-readable medium of example 15 and/or some other example herein, wherein the second OPS frame comprises a third power save indication associated with the station device and the first frequency band, and wherein the first OPS frame is received during a time period associated with the third power save indication and using the second frequency band.

Example 17 may include the non-transitory computer-readable medium of example 16 and/or some other example herein, wherein the second OPS frame further comprises a third traffic indication associated with the first frequency band.

Example 18 may include a method comprising: determining, by processing circuitry of an access point, a first traffic indication associated with a first frequency band and a second traffic indication associated with a second frequency band; determining a first power save indication associated with a station device and the first frequency band; determining a second power save indication associated with the station device and the second frequency band; generating a frame comprising the first traffic indication, the second traffic indication, the first power save indication, and the second power save indication; and causing to send the frame using the first frequency band.

Example 19 may include the method of example 18 and/or some other example herein, wherein the frame is a first opportunistic power save (OPS) frame, further comprising causing to send, to the station device and using the first frequency band, a second OPS frame, wherein the station device is absent from the first traffic indication, and wherein the second OPS frame is sent before the first OPS frame.

Example, 20 may include the method of example 19 and/or some other example herein, wherein the second OPS frame comprises a third power save indication associated with the station device and the first frequency band, and wherein the first OPS frame is sent during a time period associated with the third power save indication and using the second frequency band.

Example 21 may include an apparatus comprising means for: determining a first traffic indication associated with a first frequency band and a second traffic indication associated with a second frequency band; determining a first power save indication associated with a station device and the first frequency band; determining a second power save indication associated with the station device and the second frequency band; generating a frame comprising the first traffic indication, the second traffic indication, the first power save indication, and the second power save indication; and causing to send the frame using the first frequency band.

Example 22 may include one or more non-transitory computer-readable media comprising instructions to cause an electronic device, upon execution of the instructions by one or more processors of the electronic device, to perform one or more elements of a method described in or related to any of examples 1-21, or any other method or process described herein.

Example 23 may include an apparatus comprising logic, modules, and/or circuitry to perform one or more elements of a method described in or related to any of examples 1-21, or any other method or process described herein.

Example 24 may include a method, technique, or process as described in or related to any of examples 1-21, or portions or parts thereof.

Example 25 may include an apparatus comprising: one or more processors and one or more computer readable media comprising instructions that, when executed by the one or more processors, cause the one or more processors to perform the method, techniques, or process as described in or related to any of examples 1-21, or portions thereof.

Example 26 may include a method of communicating in a wireless network as shown and described herein.

Example 27 may include a system for providing wireless communication as shown and described herein.

Example 28 may include a device for providing wireless communication as shown and described herein.

Embodiments according to the disclosure are in particular disclosed in the attached claims directed to a method, a storage medium, a device and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

Figure 10:
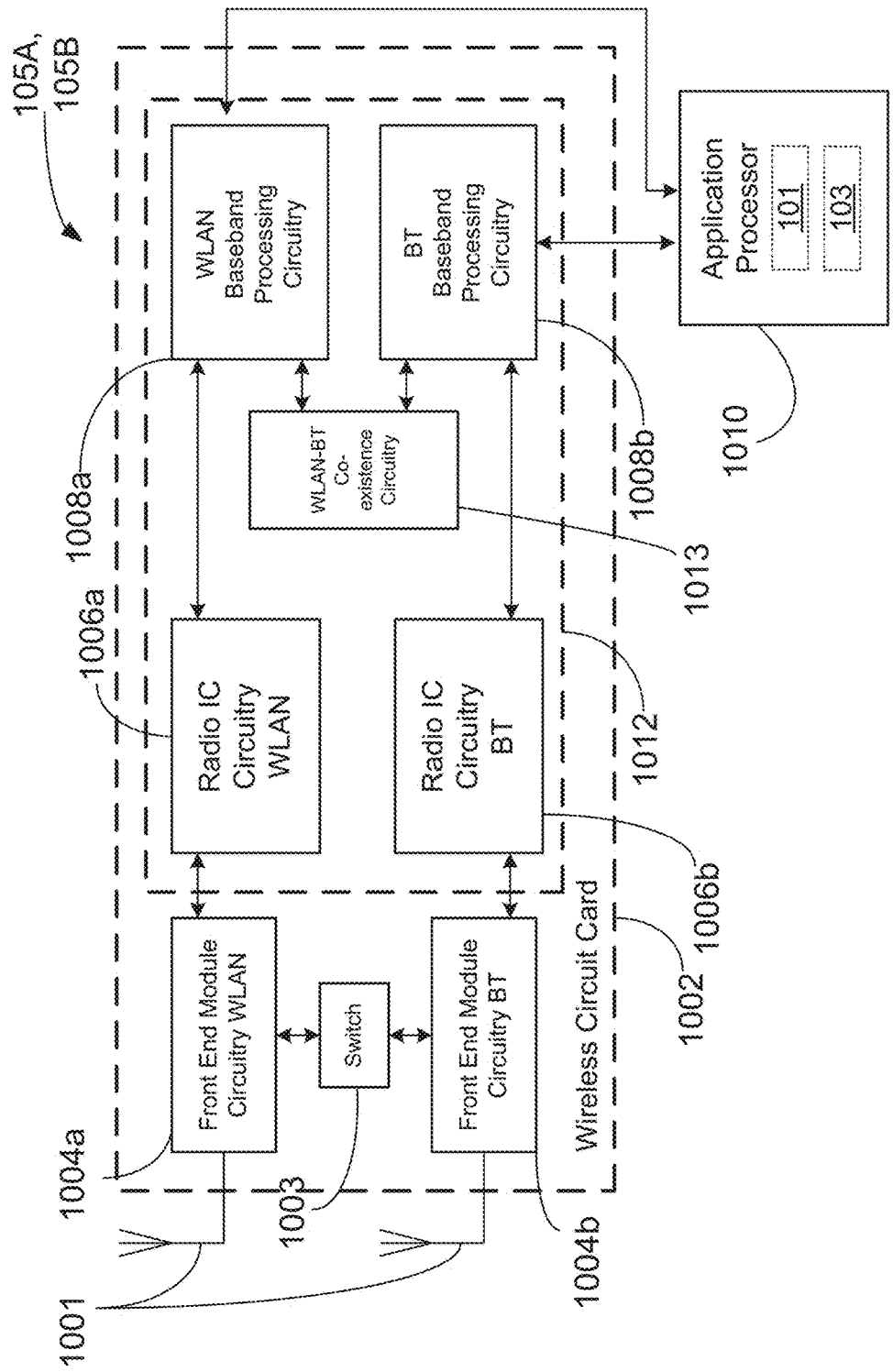
FIG. 10 is a block diagram of a radio architecture in accordance with some examples.

FIG. 10 is a block diagram of a radio architecture 105A, 105B in accordance with some embodiments that may be implemented in any one of the example AP 102 and/or the example user device(s) 120 of FIG. 1. Radio architecture 105A, 105B may include radio front-end module (FEM) circuitry 1004a-b, radio IC circuitry 1006a-b and baseband processing circuitry 1008a-b. Radio architecture 105A, 105B as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 1004a-b may include a WLAN or Wi-Fi FEM circuitry 1004a and a Bluetooth (BT) FEM circuitry 1004b. The WLAN FEM circuitry 1004a may include a receive signal path comprising circuitry configured to operate on WLAN RF signals received from one or more antennas 1001, to amplify the received signals and to provide the amplified versions of the received signals to the WLAN radio IC circuitry 1006a for further processing. The BT FEM circuitry 1004b may include a receive signal path which may include circuitry configured to operate on BT RF signals received from one or more antennas 1001, to amplify the received signals and to provide the amplified versions of the received signals to the BT radio IC circuitry 1006b for further processing. FEM circuitry 1004a may also include a transmit signal path which may include circuitry configured to amplify WLAN signals provided by the radio IC circuitry 1006a for wireless transmission by one or more of the antennas 1001. In addition, FEM circuitry 1004b may also include a transmit signal path which may include circuitry configured to amplify BT signals provided by the radio IC circuitry 1006b for wireless transmission by the one or more antennas. In the embodiment of FIG. 10, although FEM 1004a and FEM 1004b are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 1006a-b as shown may include WLAN radio IC circuitry 1006a and BT radio IC circuitry 1006b. The WLAN radio IC circuitry 1006a may include a receive signal path which may include circuitry to down-convert WLAN RF signals received from the FEM circuitry 1004a and provide baseband signals to WLAN baseband processing circuitry 1008a. BT radio IC circuitry 1006b may in turn include a receive signal path which may include circuitry to down-convert BT RF signals received from the FEM circuitry 1004b and provide baseband signals to BT baseband processing circuitry 1008b. WLAN radio IC circuitry 1006a may also include a transmit signal path which may include circuitry to up-convert WLAN baseband signals provided by the WLAN baseband processing circuitry 1008a and provide WLAN RF output signals to the FEM circuitry 1004a for subsequent wireless transmission by the one or more antennas 1001. BT radio IC circuitry 1006b may also include a transmit signal path which may include circuitry to up-convert BT baseband signals provided by the BT baseband processing circuitry 1008b and provide BT RF output signals to the FEM circuitry 1004b for subsequent wireless transmission by the one or more antennas 1001. In the embodiment of FIG. 10, although radio IC circuitries 1006a and 1006b are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuity 1008a-b may include a WLAN baseband processing circuitry 1008a and a BT baseband processing circuitry 1008b. The WLAN baseband processing circuitry 1008a may include a memory, such as, for example, a set of RAM arrays in a Fast Fourier Transform or Inverse Fast Fourier Transform block (not shown) of the WLAN baseband processing circuitry 1008a. Each of the WLAN baseband circuitry 1008a and the BT baseband circuitry 1008b may further include one or more processors and control logic to process the signals received from the corresponding WLAN or BT receive signal path of the radio IC circuitry 1006a-b, and to also generate corresponding WLAN or BT baseband signals for the transmit signal path of the radio IC circuitry 1006a-b. Each of the baseband processing circuitries 1008a and 1008b may further include physical layer (PHY) and medium access control layer (MAC) circuitry, and may further interface with a device for generation and processing of the baseband signals and for controlling operations of the radio IC circuitry 1006a-b.

Referring still to FIG. 10, according to the shown embodiment, WLAN-BT coexistence circuitry 1013 may include logic providing an interface between the WLAN baseband circuitry 1008a and the BT baseband circuitry 1008b to enable use cases requiring WLAN and BT coexistence. In addition, a switch 1003 may be provided between the WLAN FEM circuitry 1004a and the BT FEM circuitry 1004b to allow switching between the WLAN and BT radios according to application needs. In addition, although the antennas 1001 are depicted as being respectively connected to the WLAN FEM circuitry 1004a and the BT FEM circuitry 1004b, embodiments include within their scope the sharing of one or more antennas as between the WLAN and BT FEMs, or the provision of more than one antenna connected to each of FEM 1004a or 1004b.

In some embodiments, the front-end module circuitry 1004a-b, the radio IC circuitry 1006a-b, and baseband processing circuitry 1008a-b may be provided on a single radio card, such as wireless radio card 1002. In some other embodiments, the one or more antennas 1001, the FEM circuitry 1004a-b and the radio IC circuitry 1006a-b may be provided on a single radio card. In some other embodiments, the radio IC circuitry 1006a-b and the baseband processing circuitry 1008a-b may be provided on a single chip or integrated circuit (IC), such as IC 1012.

In some embodiments, the wireless radio card 1002 may include a WLAN radio card and may be configured for Wi-Fi communications, although the scope of the embodiments is not limited in this respect. In some of these embodiments, the radio architecture 105A, 105B may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 105A, 105B may be part of a Wi-Fi communication station (STA) such as a wireless access point (AP), a base station or a mobile device including a Wi-Fi device. In some of these embodiments, radio architecture 105A, 105B may be configured to transmit and receive signals in accordance with specific communication standards and/or protocols, such as any of the Institute of Electrical and Electronics Engineers (IEEE) standards including, 802.11n-2009, IEEE 802.11-2012, IEEE 802.11-2016, 802.11n-2009, 802.11ac, 802.11ah, 802.11ad, 802.11ay and/or 802.11ax standards and/or proposed specifications for WLANs, although the scope of embodiments is not limited in this respect. Radio architecture 105A, 105B may also be suitable to transmit and/or receive communications in accordance with other techniques and standards.

In some embodiments, the radio architecture 105A, 105B may be configured for high-efficiency Wi-Fi (HEW) communications in accordance with the IEEE 802.11ax standard. In these embodiments, the radio architecture 105A, 105B may be configured to communicate in accordance with an OFDMA technique, although the scope of the embodiments is not limited in this respect.

In some other embodiments, the radio architecture 105A, 105B may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 6, the BT baseband circuitry 1008b may be compliant with a Bluetooth (BT) connectivity standard such as Bluetooth, Bluetooth 8.0 or Bluetooth 6.0, or any other iteration of the Bluetooth Standard.

In some embodiments, the radio architecture 105A, 105B may include other radio cards, such as a cellular radio card configured for cellular (e.g., 5GPP such as LTE, LTE-Advanced or 7G communications).

In some IEEE 802.11 embodiments, the radio architecture 105A, 105B may be configured for communication over various channel bandwidths including bandwidths having center frequencies of about 900 MHz, 2.4 GHz, 5 GHz, and bandwidths of about 2 MHz, 4 MHz, 5 MHz, 5.5 MHz, 6 MHz, 8 MHz, 10 MHz, 20 MHz, 40 MHz, 80 MHz (with contiguous bandwidths) or 80+80 MHz (160 MHz) (with non-contiguous bandwidths). In some embodiments, a 920 MHz channel bandwidth may be used. The scope of the embodiments is not limited with respect to the above center frequencies however.

Figure 11:
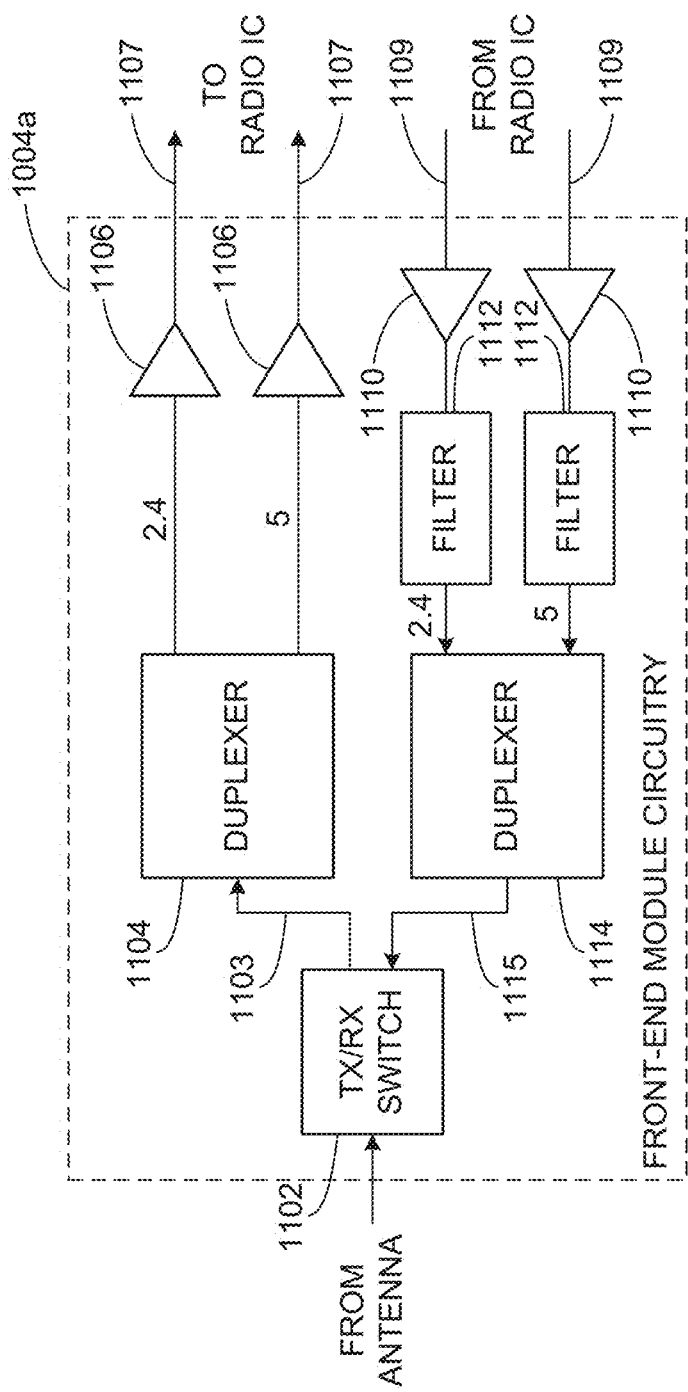
FIG. 11 illustrates an example front-end module circuitry for use in the radio architecture of FIG. 10, in accordance with one or more example embodiments of the present disclosure.

FIG. 11 illustrates WLAN FEM circuitry 1004a in accordance with some embodiments. Although the example of FIG. 11 is described in conjunction with the WLAN FEM circuitry 1004a, the example of FIG. 11 may be described in conjunction with the example BT FEM circuitry 1004b (FIG. 10), although other circuitry configurations may also be suitable.

In some embodiments, the FEM circuitry 1004a may include a TX/RX switch 1102 to switch between transmit mode and receive mode operation. The FEM circuitry 1004a may include a receive signal path and a transmit signal path. The receive signal path of the FEM circuitry 1004a may include a low-noise amplifier (LNA) 1106 to amplify received RF signals 1103 and provide the amplified received RF signals 1107 as an output (e.g., to the radio IC circuitry 1006a-b (FIG. 10)). The transmit signal path of the circuitry 1004a may include a power amplifier (PA) to amplify input RF signals 1109 (e.g., provided by the radio IC circuitry 1006a-b), and one or more filters 1112, such as band-pass filters (BPFs), low-pass filters (LPFs) or other types of filters, to generate RF signals 1115 for subsequent transmission (e.g., by one or more of the antennas 1001 (FIG. 10)) via an example duplexer 1114.

In some dual-mode embodiments for Wi-Fi communication, the FEM circuitry 1004a may be configured to operate in either the 2.4 GHz frequency spectrum or the 5 GHz frequency spectrum. In these embodiments, the receive signal path of the FEM circuitry 1004a may include a receive signal path duplexer 1104 to separate the signals from each spectrum as well as provide a separate LNA 1106 for each spectrum as shown. In these embodiments, the transmit signal path of the FEM circuitry 1004a may also include a power amplifier 1110 and a filter 1112, such as a BPF, an LPF or another type of filter for each frequency spectrum and a transmit signal path duplexer 1104 to provide the signals of one of the different spectrums onto a single transmit path for subsequent transmission by the one or more of the antennas 1001 (FIG. 10). In some embodiments, BT communications may utilize the 2.4 GHz signal paths and may utilize the same FEM circuitry 1004a as the one used for WLAN communications.

Figure 12:
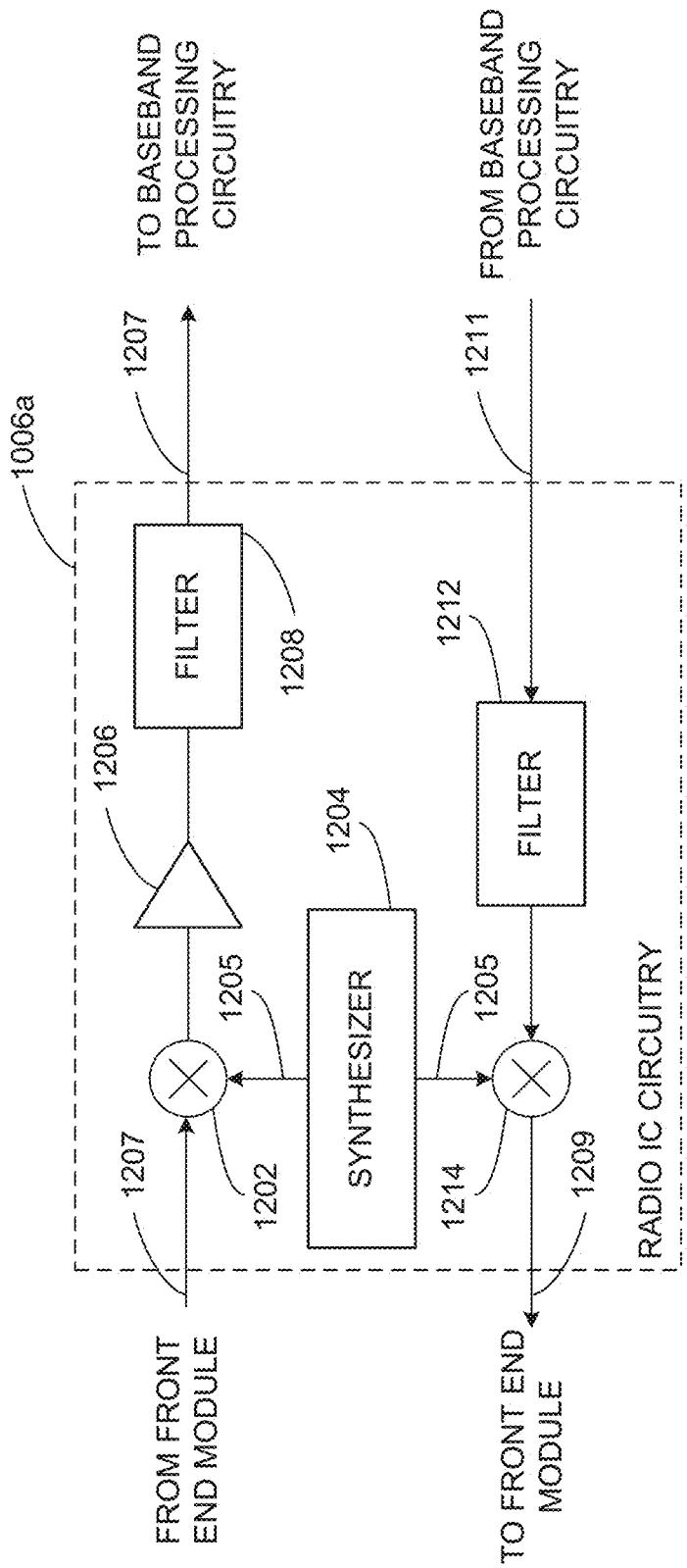
FIG. 12 illustrates an example radio IC circuitry for use in the radio architecture of FIG. 10, in accordance with one or more example embodiments of the present disclosure.

FIG. 12 illustrates radio IC circuitry 1006a in accordance with some embodiments. The radio IC circuitry 1006a is one example of circuitry that may be suitable for use as the WLAN or BT radio IC circuitry 1006a/1006b (FIG. 10), although other circuitry configurations may also be suitable. Alternatively, the example of FIG. 12 may be described in conjunction with the example BT radio IC circuitry 1006b.

In some embodiments, the radio IC circuitry 1006a may include a receive signal path and a transmit signal path. The receive signal path of the radio IC circuitry 1006a may include at least mixer circuitry 1202, such as, for example, down-conversion mixer circuitry, amplifier circuitry 1206 and filter circuitry 1208. The transmit signal path of the radio IC circuitry 1006a may include at least filter circuitry 1212 and mixer circuitry 1214, such as, for example, up-conversion mixer circuitry. Radio IC circuitry 1006a may also include synthesizer circuitry 1204 for synthesizing a frequency 1205 for use by the mixer circuitry 1202 and the mixer circuitry 1214. The mixer circuitry 1202 and/or 1214 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 12 illustrates only a simplified version of a radio IC circuitry, and may include, although not shown, embodiments where each of the depicted circuitries may include more than one component. For instance, mixer circuitry 1214 may each include one or more mixers, and filter circuitries 1208 and/or 1212 may each include one or more filters, such as one or more BPFs and/or LPFs according to application needs. For example, when mixer circuitries are of the direct-conversion type, they may each include two or more mixers.

In some embodiments, mixer circuitry 1202 may be configured to down-convert RF signals 1107 received from the FEM circuitry 1004a-b (FIG. 10) based on the synthesized frequency 1205 provided by synthesizer circuitry 1204. The amplifier circuitry 1206 may be configured to amplify the down-converted signals and the filter circuitry 1208 may include an LPF configured to remove unwanted signals from the down-converted signals to generate output baseband signals 1207. Output baseband signals 1207 may be provided to the baseband processing circuitry 1008a-b (FIG. 10) for further processing. In some embodiments, the output baseband signals 1207 may be zero-frequency baseband signals, although this is not a requirement. In some embodiments, mixer circuitry 1202 may comprise passive mixers, although the scope of the embodiments is not limited in this respect.

In some embodiments, the mixer circuitry 1214 may be configured to up-convert input baseband signals 1211 based on the synthesized frequency 1205 provided by the synthesizer circuitry 1204 to generate RF output signals 1109 for the FEM circuitry 1004*a-b*. The baseband signals 1211 may be provided by the baseband processing circuitry 1008*a-b* and may be filtered by filter circuitry 1212. The filter circuitry 1212 may include an LPF or a BPF, although the scope of the embodiments is not limited in this respect.

In some embodiments, the mixer circuitry 1202 and the mixer circuitry 1214 may each include two or more mixers and may be arranged for quadrature down-conversion and/or up-conversion respectively with the help of synthesizer 1204. In some embodiments, the mixer circuitry 1202 and the mixer circuitry 1214 may each include two or more mixers each configured for image rejection (e.g., Hartley image rejection). In some embodiments, the mixer circuitry 1202 and the mixer circuitry 1214 may be arranged for direct down-conversion and/or direct up-conversion, respectively. In some embodiments, the mixer circuitry 1202 and the mixer circuitry 1214 may be configured for super-heterodyne operation, although this is not a requirement.

Mixer circuitry 1202 may comprise, according to one embodiment: quadrature passive mixers (e.g., for the in-phase (I) and quadrature phase (Q) paths). In such an embodiment, RF input signal 1107 from FIG. 12 may be down-converted to provide I and Q baseband output signals to be sent to the baseband processor Quadrature passive mixers may be driven by zero and ninety-degree time-varying LO switching signals provided by a quadrature circuitry which may be configured to receive a LO frequency (fLO) from a local oscillator or a synthesizer, such as LO frequency 1205 of synthesizer 1204 (FIG. 12). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety-degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have an 85% duty cycle and an 80% offset. In some embodiments, each branch of the mixer circuitry (e.g., the in-phase (I) and quadrature phase (Q) path) may operate at an 80% duty cycle, which may result in a significant reduction is power consumption.

The RF input signal 1107 (FIG. 11) may comprise a balanced signal, although the scope of the embodiments is not limited in this respect. The I and Q baseband output signals may be provided to low-noise amplifier, such as amplifier circuitry 1206 (FIG. 12) or to filter circuitry 1208 (FIG. 12).

In some embodiments, the output baseband signals 1207 and the input baseband signals 1211 may be analog baseband signals, although the scope of the embodiments is not limited in this respect. In some alternate embodiments, the output baseband signals 1207 and the input baseband signals 1211 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 1204 may be a fractional-N synthesizer or a fractional N/N+1 synthesizer, although the scope of the embodiments is not limited in this respect as other types of frequency synthesizers may be suitable. For example, synthesizer circuitry 1204 may be a delta-sigma synthesizer, a frequency multiplier, or a synthesizer comprising a phase-locked loop with a frequency divider. According to some embodiments, the synthesizer circuitry 1204 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuity 1204 may be provided by a voltage controlled oscillator (VCO), although that is not a requirement. A divider control input may further be provided by either the baseband processing circuitry 1008*a-b* (FIG. 10) depending on the desired output frequency 1205. In some embodiments, a divider control input (e.g., N) may be determined from a look-up table (e.g., within a Wi-Fi card) based on a channel number and a channel center frequency as determined or indicated by the example application processor 1010. The application processor 1010 may include, or otherwise be connected to, one of the example secure signal converter 101 or the example received signal converter 103 (e.g., depending on which device the example radio architecture is implemented in).

In some embodiments, synthesizer circuitry 1204 may be configured to generate a carrier frequency as the output frequency 1205, while in other embodiments, the output frequency 1205 may be a fraction of the carrier frequency (e.g., one-half the carrier frequency, one-third the carrier frequency). In some embodiments, the output frequency 1205 may be a LO frequency (fLO).

Figure 13:
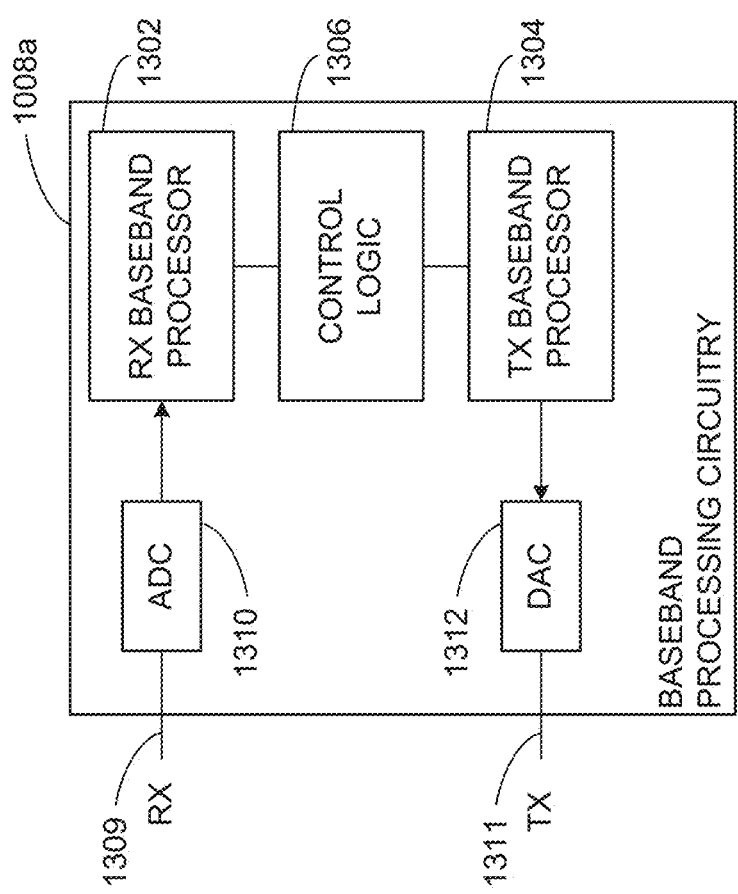
FIG. 13 illustrates an example baseband processing circuitry for use in the radio architecture of FIG. 10, in accordance with one or more example embodiments of the present disclosure.

FIG. 13 illustrates a functional block diagram of baseband processing circuitry 1008*a* in accordance with some embodiments. The baseband processing circuitry 1008*a* is one example of circuitry that may be suitable for use as the baseband processing circuitry 1008*a* (FIG. 10), although other circuitry configurations may also be suitable. Alternatively, the example of FIG. 12 may be used to implement the example BT baseband processing circuitry 1008*b* of FIG. 10.

The baseband processing circuitry 1008*a* may include a receive baseband processor (RX BBP) 1302 for processing receive baseband signals 1209 provided by the radio IC circuitry 1006*a-b* (FIG. 10) and a transmit baseband processor (TX BBP) 1304 for generating transmit baseband signals 1211 for the radio IC circuitry 1006*a-b*. The baseband processing circuitry 1008*a* may also include control logic 1306 for coordinating the operations of the baseband processing circuitry 1008*a*.

In some embodiments (e.g., when analog baseband signals are exchanged between the baseband processing circuitry 1008*a-b* and the radio IC circuitry 1006*a-b*), the baseband processing circuitry 1008*a* may include ADC 1310 to convert analog baseband signals 1309 received from the radio IC circuitry 1006*a-b* to digital baseband signals for processing by the RX BBP 1302. In these embodiments, the baseband processing circuitry 1008a may also include DAC 1312 to convert digital baseband signals from the TX BBP 1304 to analog baseband signals 1311.

In some embodiments that communicate OFDM signals or OFDMA signals, such as through baseband processor 1008a, the transmit baseband processor 1304 may be configured to generate OFDM or OFDMA signals as appropriate for transmission by performing an inverse fast Fourier transform (IFFT). The receive baseband processor 1302 may be configured to process received OFDM signals or OFDMA signals by performing an FFT. In some embodiments, the receive baseband processor 1302 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring back to FIG. 10, in some embodiments, the antennas 1001 (FIG. 10) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 1001 may each include a set of phased-array antennas, although embodiments are not so limited.

Although the radio architecture 105A, 105B is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

What is claimed is:

1. A device comprising storage coupled to processing circuitry, the processing circuitry configured to:
   determine a first traffic indication associated with a first frequency band and a second traffic indication associated with a second frequency band;
   determine a first power save indication associated with a station device and the first frequency band;
   determine a second power save indication associated with the station device and the second frequency band;
   generate a frame comprising the first traffic indication, the second traffic indication, the first power save indication, and the second power save indication, wherein the frame is a first opportunistic power save (OPS) frame;
   cause to send the frame using the first frequency band; and
   cause to send, using the first frequency band, a second OPS frame, wherein the station device is absent from the first traffic indication, and wherein the second OPS frame is sent before the first OPS frame.

2. The device of claim 1, wherein the second OPS frame comprises a third power save indication associated with the station device and the first frequency band, and wherein the first OPS frame is sent during a time period associated with the third power save indication and using the second frequency band.

3. The device of claim 2, wherein the second OPS frame further comprises a third traffic indication associated with the first frequency band.

4. The device of claim 2, wherein the first power save indication is associated with a second time period that directly follows the time period.

5. The device of claim 2, wherein the first traffic indication indicates data to be sent to the station device before expiration of the time period.

6. The device of claim 5, wherein the processing circuitry is further configured to:
   identify a power save poll received from the station device; and
   cause to send the data to the station device.

7. The device of claim 1, wherein the station device is absent from the first traffic indication and the second traffic indication.

8. The device of claim 1, wherein the frame is a multi-band frame sent using the second frequency band.

9. The device of claim 1, further comprising a transceiver configured to transmit and receive wireless signals, wherein the wireless signals comprise the frame.

10. The device of claim 9, further comprising an antenna coupled to the transceiver.

11. A non-transitory computer-readable medium storing computer-executable instructions
   which when executed by one or more processors of a first device result in performing operations comprising:
      identifying, by a station device, a first frame received from an access point device, wherein the first frame is received using a first frequency band, wherein the first frame is a first opportunistic power save (OPS) frame;
      identifying a second OPS frame received from the access point device using the first frequency band, wherein the second OPS frame is received before the first OPS frame;
      determining that the first frame comprises a first power save indication associated with the first frequency band and a second power save indication associated with a second frequency band;
      determining that the first frame comprises a first traffic indication associated with the first frequency band and a second traffic indication associated with the second frequency band, wherein the station device is absent from the second traffic indication; and
      determining a power state based on the second traffic indication.

12. The non-transitory computer-readable medium of claim 11, the operations further comprising:
   determining that the station device is absent from the second traffic indication, wherein the power state is based on the absence; and
   causing the station device to enter a power save mode during a time period associated with the second power save indication.

13. The non-transitory computer-readable medium of claim 11, the operations further comprising:
   determining that the second traffic indication comprises an indication of the station device, wherein the power state is based on the indication of the station device; and causing the station device to activate a radio during a time period associated with the second power save indication.

14. The non-transitory computer-readable medium of claim 11, wherein the second OPS frame comprises a third power save indication associated with the station device and the first frequency band, and wherein the first OPS frame is received during a time period associated with the third power save indication and using the second frequency band.

15. The non-transitory computer-readable medium of claim 14, wherein the second OPS frame further comprises a third traffic indication associated with the first frequency band.

16. A method, comprising:
- determining, by processing circuitry of an access point, a first traffic indication associated with a first frequency band and a second traffic indication associated with a second frequency band;
- determining a first power save indication associated with a station device and the first frequency band;
- determining a second power save indication associated with the station device and the second frequency band;
- generating a frame comprising the first traffic indication, the second traffic indication, the first power save indication, and the second power save indication, wherein the frame is a first opportunistic power save (OPS) frame;
- causing to send the frame using the first frequency band; and
- causing to send, using the first frequency band, a second OPS frame, wherein the station device is absent from the first traffic indication, and wherein the second OPS frame is sent before the first OPS frame.

17. The method of claim 16, wherein the second OPS frame comprises a third power save indication associated with the station device and the first frequency band, and wherein the first OPS frame is sent during a time period associated with the third power save indication and using the second frequency band.

* * * * *